US011466747B2

(12) United States Patent
Nakano et al.

(10) Patent No.: US 11,466,747 B2
(45) Date of Patent: Oct. 11, 2022

(54) DAMPING FORCE GENERATING MECHANISM AND PRESSURE SHOCK ABSORBER

(71) Applicant: SHOWA CORPORATION, Gyoda (JP)

(72) Inventors: Gota Nakano, Gyoda (JP); Chikara Yanagisawa, Gyoda (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 32 days.

(21) Appl. No.: 17/074,143

(22) Filed: Oct. 19, 2020

(65) Prior Publication Data

US 2021/0102595 A1 Apr. 8, 2021

Related U.S. Application Data

(63) Continuation of application No. PCT/JP2019/016967, filed on Apr. 22, 2019, which is
(Continued)

(51) Int. Cl.
*F16F 9/46* (2006.01)
*F16F 9/18* (2006.01)
(Continued)

(52) U.S. Cl.
CPC ............... *F16F 9/46* (2013.01); *F16F 9/18* (2013.01); *F16F 9/185* (2013.01); *F16F 9/34* (2013.01);
(Continued)

(58) Field of Classification Search
CPC ...... F16F 9/46; F16F 9/18; F16F 9/185; F16F 9/34; F16F 9/348; F16F 9/3484;
(Continued)

(56) References Cited

U.S. PATENT DOCUMENTS 4,905,799 A 3/1990 Yamaoka et al.
6,119,829 A * 9/2000 Nakadate ............... F16F 9/348
188/266.6
(Continued)

FOREIGN PATENT DOCUMENTS

CN 1651796 A 8/2005
JP 02-066333 A 3/1990
(Continued)

OTHER PUBLICATIONS

Chinese Office Action dated Sep. 1, 2021 for the corresponding Chinese Patent Application No. 201980027719.5.
(Continued)

*Primary Examiner* — Robert A. Siconolfi
*Assistant Examiner* — James K Hsiao
(74) *Attorney, Agent, or Firm* — Leason Ellis LLP

(57) ABSTRACT

A damping force generating mechanism includes: a flow passage formation part that forms a flow passage through which a liquid flows; and a valve that is configured to control a flow of the liquid in the flow passage. The flow passage formation part includes a first seat part that is provided radially outward of a flow passage port of the flow passage, protrudes from the flow passage port and contacts the valve, a second seat part that is provided radially outward of the first seat part, protrudes from the flow passage port and contacts the valve, and a circulation part having an orifice that allows the liquid to flow from the flow passage port toward the second seat part in a state in which the valve is in contact with the first seat part.

7 Claims, 18 Drawing Sheets

Related U.S. Application Data a continuation-in-part of application No. PCT/JP2018/022582, filed on Jun. 13, 2018.

(51) Int. Cl.

| | | |
|---|---|---|
| *F16F 9/34* | (2006.01) | |
| *B60G 13/08* | (2006.01) | |
| *B60G 17/08* | (2006.01) | |
| *F16F 9/348* | (2006.01) | |
| *F16F 9/516* | (2006.01) | |
| *F16F 9/512* | (2006.01) | |

(52) U.S. Cl.
CPC ............ *F16F 9/348* (2013.01); *F16F 9/3484* (2013.01); *F16F 9/3485* (2013.01); *F16F 9/516* (2013.01); *B60G 13/08* (2013.01); *B60G 17/08* (2013.01); *B60G 2202/24* (2013.01); *B60G 2206/41* (2013.01); *B60G 2500/114* (2013.01); *B60G 2800/162* (2013.01); *F16F 9/5126* (2013.01); *F16F 2222/12* (2013.01); *F16F 2226/04* (2013.01); *F16F 2228/066* (2013.01); *F16F 2232/08* (2013.01); *F16F 2234/02* (2013.01)

(58) Field of Classification Search
CPC ........ F16F 9/3485; F16F 9/516; F16F 9/5126; F16F 2222/12; F16F 2226/04; F16F 2228/066; F16F 2232/08; F16F 2232/02; B60G 13/08; B60G 17/08; B60G 2202/24; B60G 2206/41; B60G 2500/114; B60G 2800/162

See application file for complete search history.

(56) References Cited

U.S. PATENT DOCUMENTS

| | | | | |
|---|---|---|---|---|
| 7,562,750 | B2* | 7/2009 | Lemmens | B60G 17/08 188/266.1 |
| 8,794,588 | B1* | 8/2014 | Jorgensen | G05D 16/0661 251/57 |
| 9,664,247 | B2* | 5/2017 | Yamashita | F16F 9/3485 |
| 10,132,378 | B2* | 11/2018 | Abe | F16F 9/465 |
| 2005/0167216 | A1 | 8/2005 | Park | |
| 2009/0242339 | A1* | 10/2009 | Nakadate | F16F 9/464 188/266.5 |
| 2011/0147147 | A1* | 6/2011 | Murakami | F16F 9/465 188/314 |
| 2011/0290603 | A1 | 12/2011 | Yabe | |
| 2012/0048666 | A1* | 3/2012 | Murakami | F16F 9/348 188/315 |
| 2013/0037361 | A1 | 2/2013 | Park et al. | |
| 2014/0150897 | A1 | 6/2014 | Ashiba | |
| 2014/0353099 | A1* | 12/2014 | Yamashita | F16F 9/512 188/314 |
| 2015/0217621 | A1* | 8/2015 | Yamashita | B60G 13/08 188/266.2 |
| 2016/0025177 | A1* | 1/2016 | Abe | F16F 9/34 251/25 |
| 2016/0025178 | A1* | 1/2016 | Kamakura | F16K 27/02 251/25 |
| 2016/0061284 | A1* | 3/2016 | Yamashita | F16F 9/3485 188/313 |
| 2020/0088261 | A1 | 3/2020 | Kimishima et al. | |

FOREIGN PATENT DOCUMENTS

| | | |
|---|---|---|
| JP | 2012-229716 A | 11/2012 |
| JP | 2014-129865 A | 7/2014 |
| JP | 2016-102574 A | 6/2016 |
| JP | 2017-048825 A | 3/2017 |
| WO | WO-2017/026332 A1 | 2/2017 |

OTHER PUBLICATIONS

International Search Report dated May 28, 2019 for the corresponding PCT International Patent Application No. PCT/JP2019/016967.

* cited by examiner

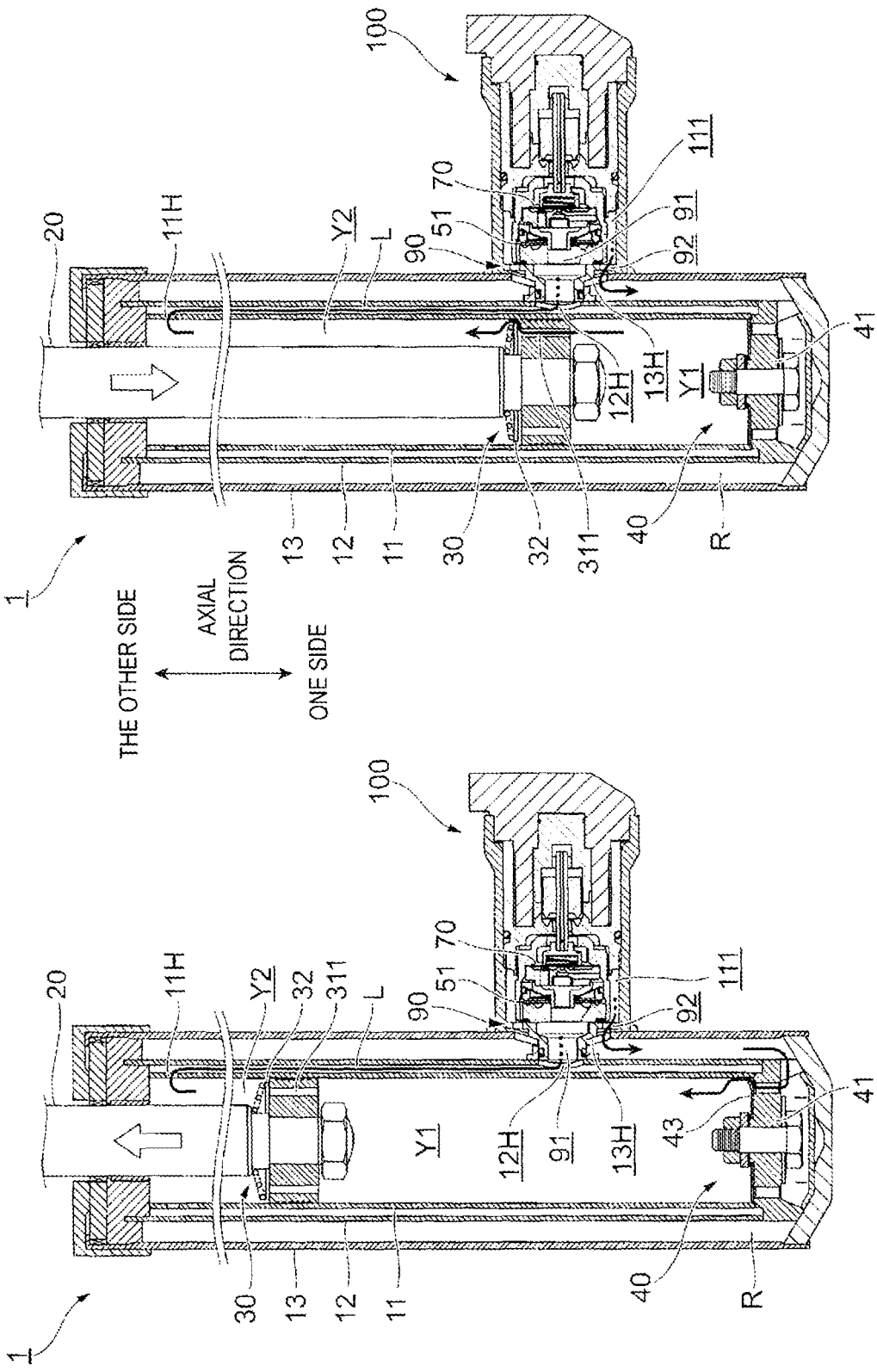

DAMPING FORCE GENERATING MECHANISM AND PRESSURE SHOCK ABSORBER

CROSS REFERENCE TO RELATED APPLICATIONS

This application is a continuation of International Patent Application No. PCT/JP2019/016967 filed on Apr. 22, 2019, claiming the benefit of priority to International Patent Application No. PCT/JP2018/022582 filed on Jun. 13, 2018, the contents of which are incorporated herein by reference in their entirety.

FIELD OF THE INVENTION

The present invention relates to a damping force generating mechanism and a pressure shock absorber.

BACKGROUND OF THE INVENTION

For example, JP 2017-48825 A discloses a simple support structure in which a main valve has an inner peripheral part clamped not from both surface sides, but only from a non-seat-part side on an inner peripheral side, and between the main valve and an outer seat part, a cut valve having an inner peripheral part clamped from both surface sides and having a low-rigidity coupling part formed between an outer peripheral part and the inner peripheral part is provided, so that a damping force by a cut part (fixed orifice) of the cut valve is obtained before the main valve is opened, and the main valve can be opened with smaller differential pressure by the simple support structure.

SUMMARY OF INVENTION

However, in a case where a valve is provided on a flow passage of the liquid to generate a damping force, characteristics of the generated damping force depends on a valve opening characteristic of the valve. Here, when the number of components involved in opening the valve is increased in order to obtain desired damping force characteristics, the device may be complicated.

An object of the present invention is to obtain a desired damping force characteristic while simplifying a structure related to a valve opening characteristic of a valve.

According to an aspect of the present invention, there is provided a damping force generating mechanism including: a valve that is configured to control a flow of a liquid in a flow passage, through which the liquid flows; a flow passage formation part including a first seat part that is formed radially outward of a flow passage port of the flow passage, protrudes from the flow passage port and contacts the valve, a second seat part that is provided more radially outward than the first seat part, protrudes from the flow passage port and contacts the valve, and a circulation part having an orifice that allows the liquid to flow from the flow passage port toward the second seat part in a state in which the valve is in contact with the first seat part; and a back pressure chamber formation part that forms a back pressure chamber for applying a back pressure to the valve and includes a contact part that contacts with the valve radially inward of a position of the second seat part.

According to another aspect of the present invention, there is provided a damping force generating mechanism including: a valve that is configured to control a flow of a liquid in a flow passage through which the liquid flows; and a flow passage formation part including a first seat part that is provided radially outward of a flow passage port of the flow passage, protrudes from the flow passage port and contacts the valve, a second seat part that is provided radially outward of the first seat part, protrudes from the flow passage port and contacts the valve, a common part that is used in common by the first seat part and the second seat part and forms a portion in contact with the valve, and a circulation part having an orifice that allows the liquid to flow from the flow passage port toward the second seat part in a state in which the valve is in contact with the first seat part, the circulation part being provided in the common part.

According to another aspect of the present invention, there is provided a pressure shock absorber including: a cylinder containing a liquid; a piston part that is connected to a rod moving in an axial direction and moves in the cylinder; a valve that is configured to control a flow of the liquid in a flow passage through which the liquid flows in accordance with a movement of the piston part; a flow passage formation part including a first seat part that is provided radially outward of a flow passage port of the flow passage, protrudes from the flow passage port and contacts the valve, a second seat part that is provided radially outward of the first seat part, protrudes from the flow passage port and contacts the valve, and a circulation part having an orifice that allows the liquid to flow from the flow passage port toward the second seat part in a state in which the valve is in contact with the first seat part; and a back pressure chamber formation part that forms a back pressure chamber for applying a back pressure to the valve and includes a contact part that contacts with the valve radially inward of a position of the second seat part.

BRIEF DESCRIPTION OF THE DRAWINGS

FIG. 7A and FIG. 7B are explanatory views showing operations of the hydraulic shock absorber according to the first embodiment.

DETAILED DESCRIPTION OF THE INVENTION

Hereinafter, embodiments of the present invention will be described in detail with reference to the accompanying drawings.

First Embodiment

[Configuration and Function of Hydraulic Shock Absorber 1]

Figure 1:
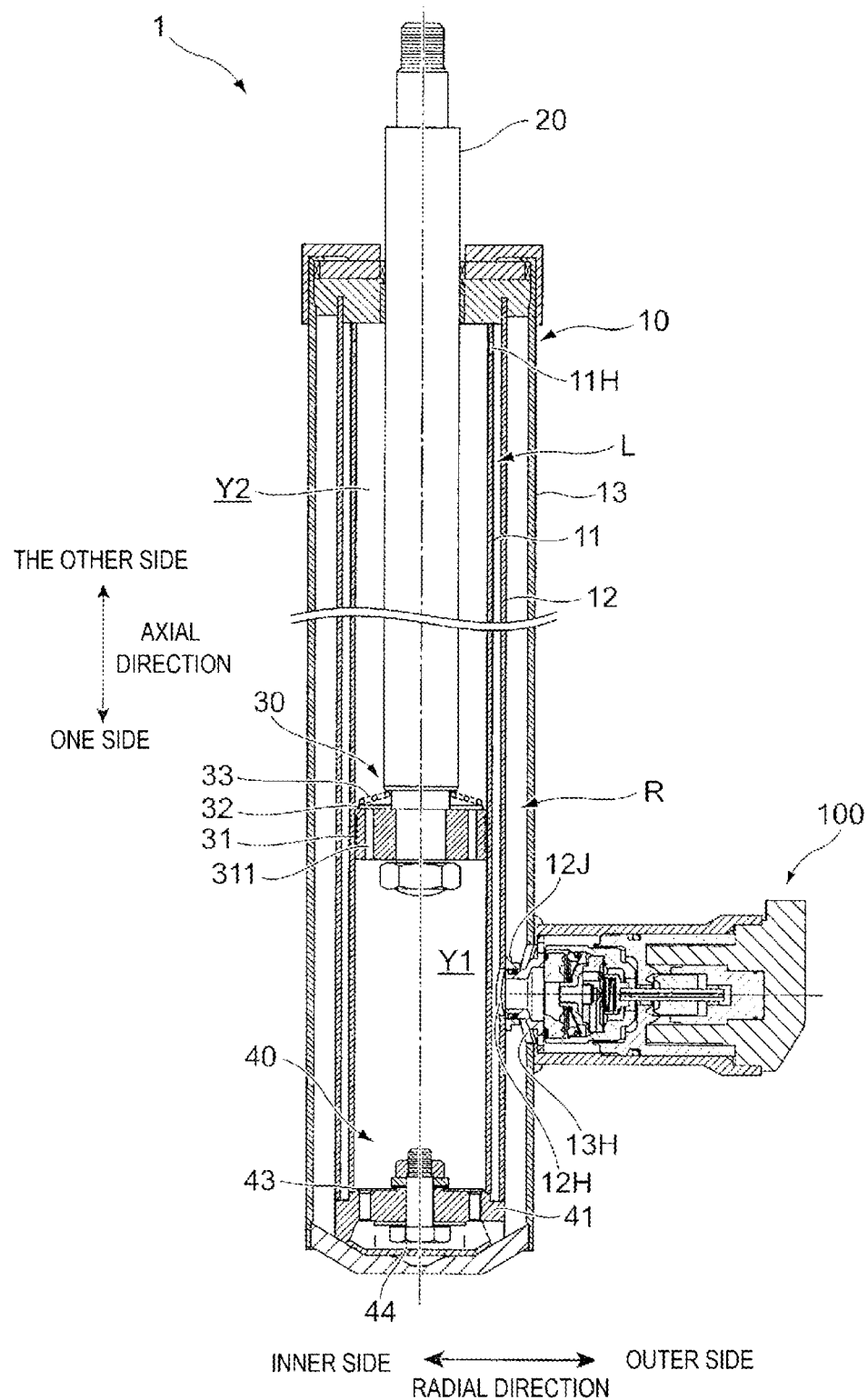
FIG. 1 is an overall view of a hydraulic shock absorber according to a first embodiment.

FIG. 1 is an overall view of a hydraulic shock absorber 1 according to a first embodiment.

As shown in FIG. 1, the hydraulic shock absorber 1 includes a cylinder part 10 for accommodating oil and a rod 20 provided with one side slidably inserted into the cylinder part 10 and the other side protruding from the cylinder part 10. In addition, the hydraulic shock absorber 1 includes a piston part 30 provided at an end part on one side of the rod 20 and a bottom part 40 provided at an end part on one side of the cylinder part 10. Further, the hydraulic shock absorber 1 includes an outer damping part 100 provided outside the cylinder part 10 to generate a damping force.

In the following description, a longitudinal direction of the cylinder part 10 shown in FIG. 1 is referred to as an "axial direction". A lower side of the cylinder part 10 in the axial direction is referred to as "one side", and an upper side of the cylinder part 10 is referred to as the "other side".

In addition, a left-right direction of the cylinder part 10 shown in FIG. 1 is referred to as a "radial direction". Further, in the radial direction, a central axis side is referred to as a "radially inner side", and a side away from a central axis is referred to as a "radially outer side".

[Configuration and Function of Cylinder Part 10]

The cylinder part 10 includes a cylinder 11 for accommodating oil, an outer tubular body 12 provided on a radially outer side of the cylinder 11, and a damper case 13 provided on a radially outer side of the cylinder 11 and further provided on a radially outer side of the outer tubular body 12.

The cylinder 11 is formed in a cylindrical shape and includes a cylinder opening 11H on the other side.

The outer tubular body 12 is formed in a cylindrical shape. Further, the outer tubular body 12 forms a communication passage L with the cylinder 11. In addition, the outer tubular body 12 includes an outer tubular body opening part 12H and an outer connection part 12J at a position facing the outer damping part 100. The outer connection part 12J has an oil flow passage and protrudes radially outward to form a connection portion with the outer damping part 100.

The damper case 13 is formed in a cylindrical shape. The damper case 13 forms a reservoir chamber R in which oil accumulates between the damper case 13 and the outer tubular body 12. The reservoir chamber R absorbs oil in the cylinder 11 and supplies oil to the inside of the cylinder 11 as the rod 20 moves relative to the cylinder 11. In addition, the reservoir chamber R stores the oil that flows out of the outer damping part 100. The damper case 13 includes a case opening part 13H at a position facing the outer damping part 100.

[Configuration and Function of Rod 20]

The rod 20 is a rod-shaped member extending long in the axial direction. The rod 20 is connected to the piston part 30 on the one side. The rod 20 is connected to, for example, a vehicle body via a connection member (not shown) on the other side. The rod 20 may be a hollow shape in which an inner side is hollow, or a solid shape in which no cavity is formed inside.

[Configuration and Function of Piston Part 30]

The piston part 30 includes a piston body 31 having a plurality of piston oil passage ports 311, a piston valve 32 for opening and closing the other side of the piston oil passage port 311, and a spring 33 provided between the piston valve 32 and an end part on one side of the rod 20. Further, the piston part 30 divides the oil in the cylinder 11 into a first oil chamber Y1 and a second oil chamber Y2.

[Configuration and Function of Bottom Part 40]

The bottom part 40 includes a valve seat 41, a check valve part 43 provided on the other side of the valve seat 41, and a fixing member 44 provided in the axial direction. Further, the bottom part 40 separates the first oil chamber Y1 and the reservoir chamber R from each other.

[Configuration and Function of Outer Damping Part 100]

Figure 2:
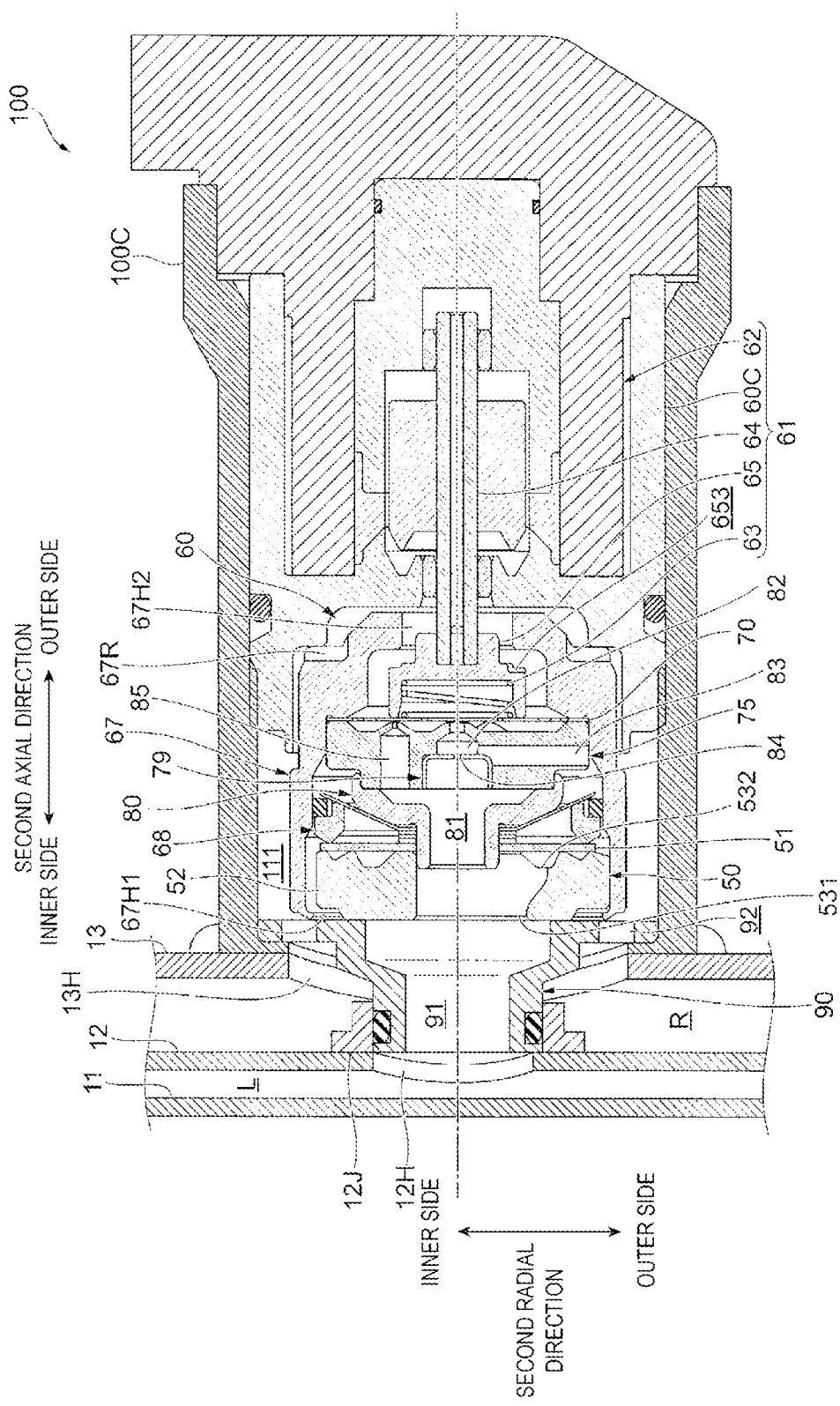
FIG. 2 is a sectional view of an outer damping part according to the first embodiment.

FIG. 2 is a sectional view of the outer damping part 100 according to the first embodiment.

Figure 3:
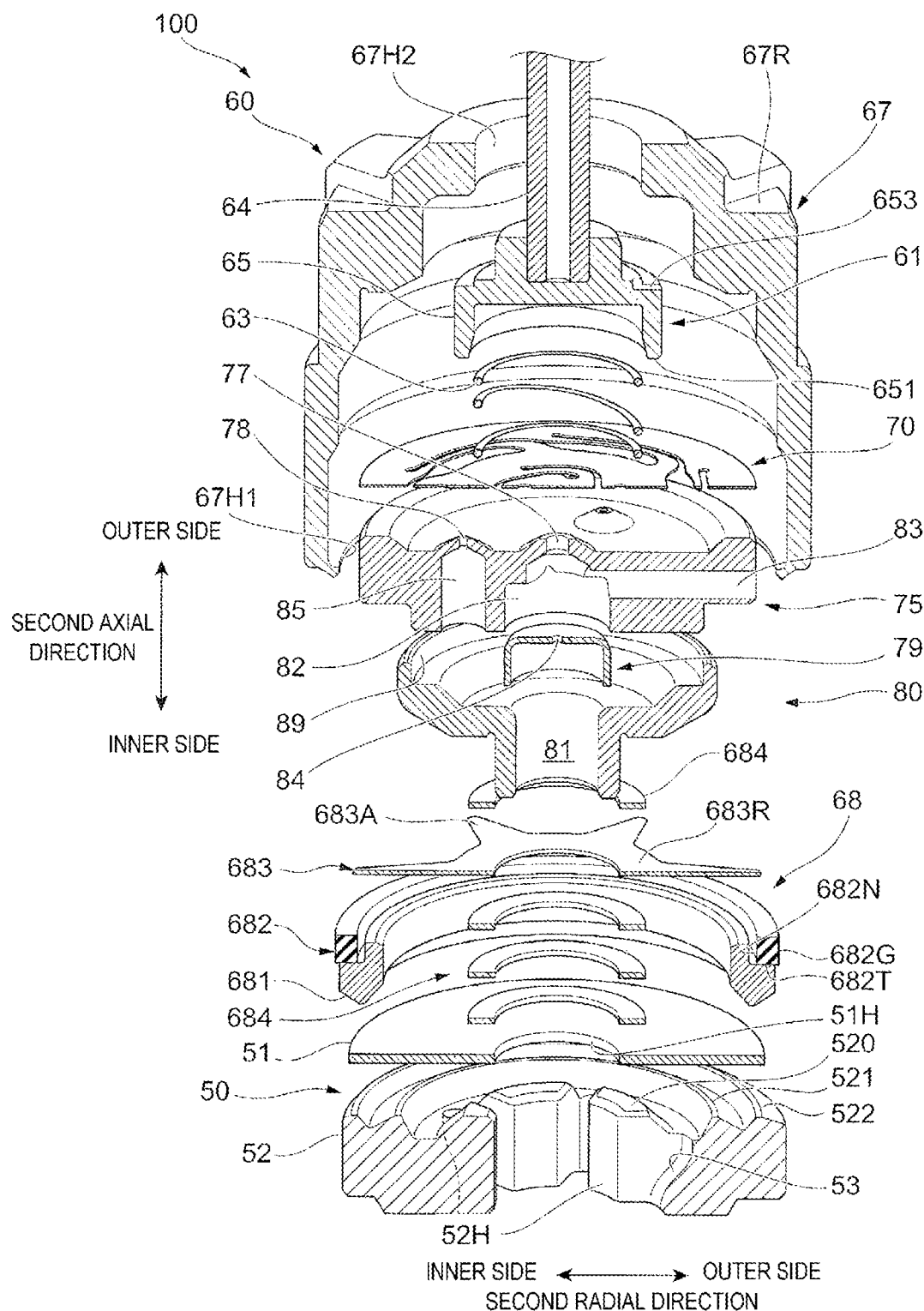
FIG. 3 is a perspective sectional view of a main valve part and a damping force adjusting part according to the first embodiment.

FIG. 3 is a perspective sectional view of a main valve part 50 and a damping force adjusting part 60 according to the first embodiment.

Figure 4:
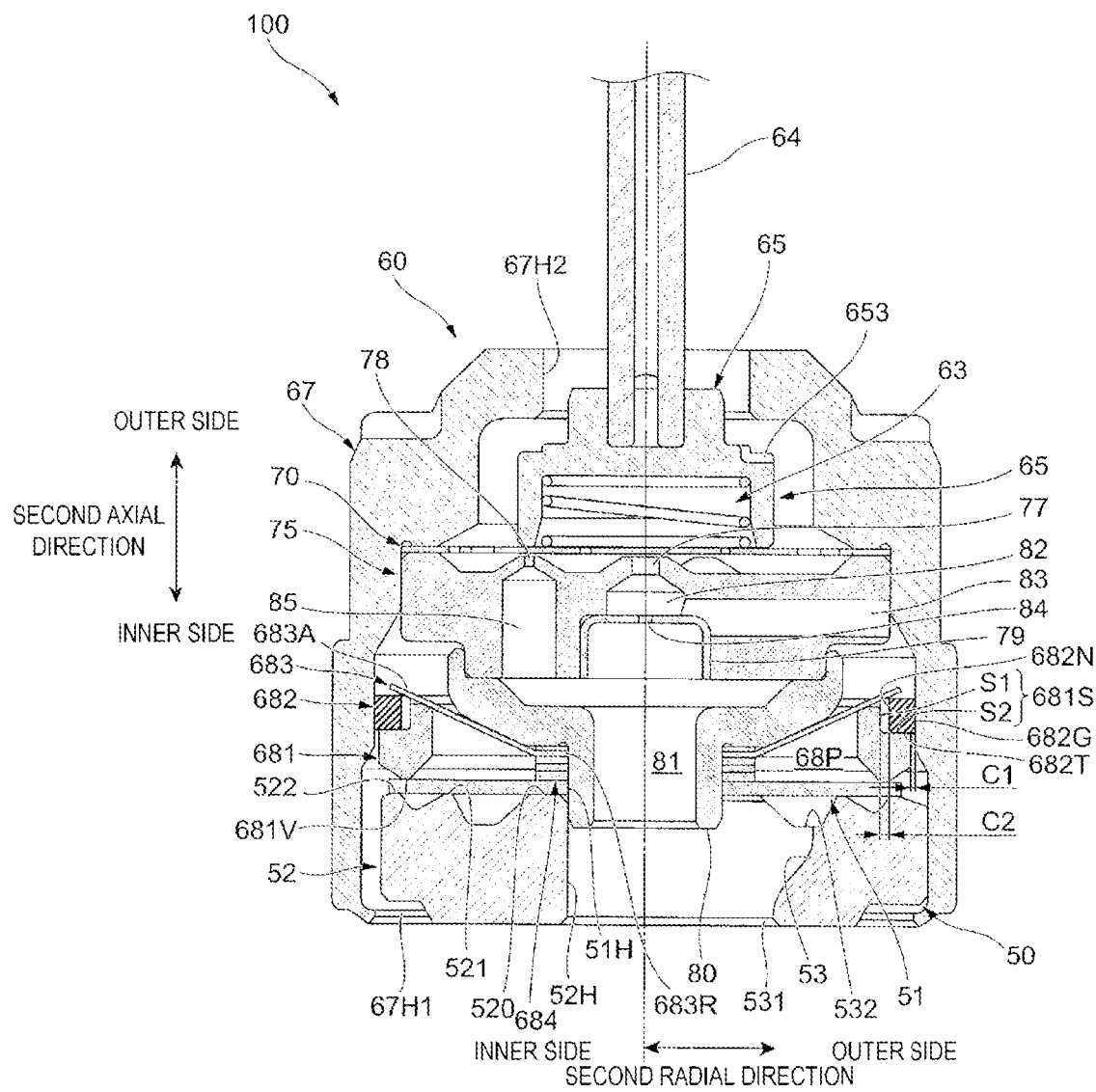
FIG. 4 is a partial sectional view of the main valve part and the damping force adjusting part according to the first embodiment.

FIG. 4 is a partial sectional view of the main valve part 50 and the damping force adjusting part 60 according to the first embodiment.

Figure 5:
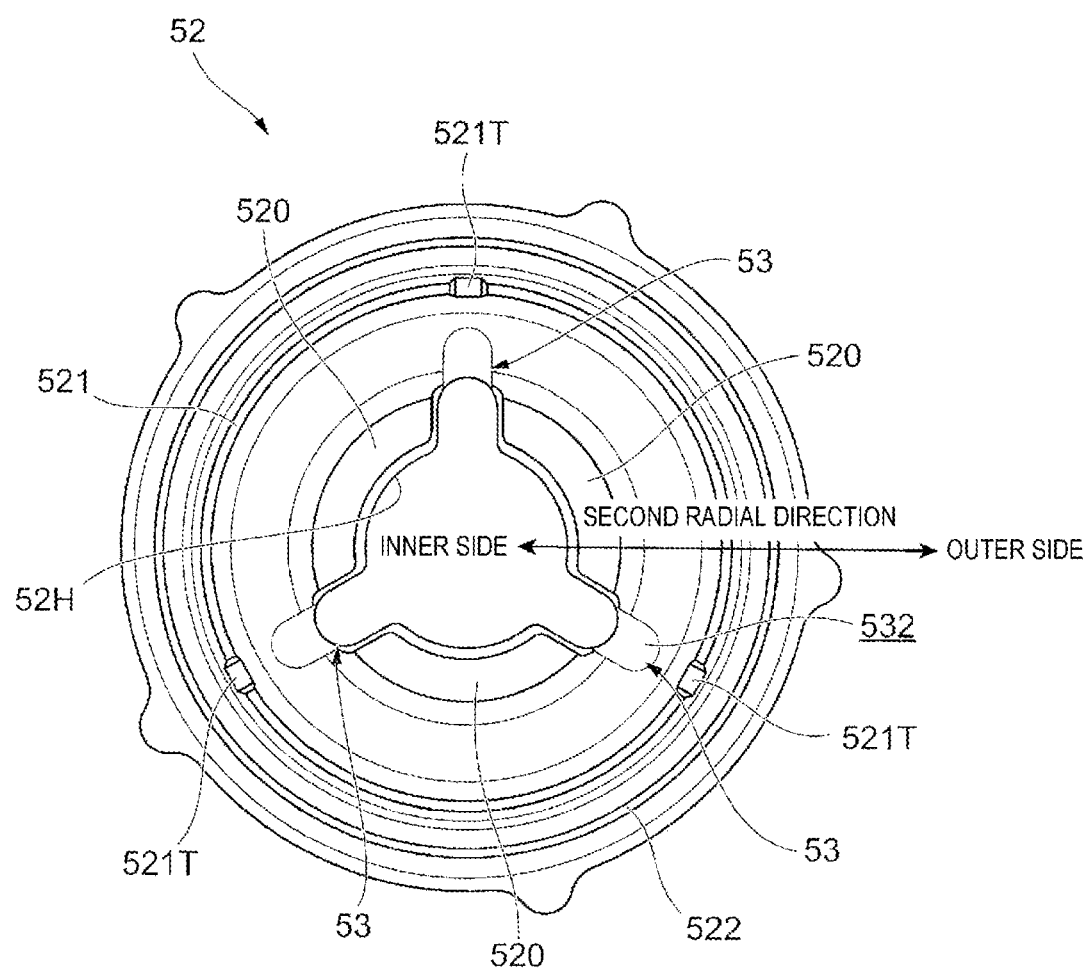
FIG. 5 is a top view of a main valve seat according to the first embodiment.

FIG. 5 is a top view of a main valve seat 52 according to the first embodiment.

In the following description, a longitudinal direction (that is, an intersecting direction (for example, a substantially orthogonal direction) intersecting the axial direction (see FIG. 1) of the cylinder part 10) of the outer damping part 100 shown in FIG. 2 is referred to as a "second axial direction". In addition, a left side of the outer damping part 100 in the second axial direction is referred to as a "second axially inner side", and a right side of the outer damping part 100 is referred to as a "second axially outer side".

An upper-lower direction (that is, a direction intersecting the second axial direction) of the outer damping part 100 shown in FIG. 2 is referred to as a "second radial direction". Further, in the second radial direction, a central axis side along a second axis is referred to as a "second radially inner side", and a side away from the central axis along the second axis is referred to as a "second radially outer side".

As shown in FIG. 2, the outer damping part 100 includes the main valve part 50 that mainly generates a damping force in the hydraulic shock absorber 1 according to the first embodiment, and the damping force adjusting part 60 that adjusts a magnitude of the damping force generated by the outer damping part 100. Further, the outer damping part 100 includes a communication part 80 that forms a parallel flow passage with respect to the main valve part 50, a connection flow passage part 90 that forms a flow passage of oil from the communication passage L with respect to the main valve part 50 and the communication part 80, and an outer housing 100C that accommodates various components constituting the outer damping part 100.

(Main Valve Part 50)

The main valve part 50 includes a main valve 51 that generates a damping force by controlling the flow of oil so as to be throttled, and a main valve seat 52 (an example of a flow passage formation part) that faces the main valve 51 and is in contact with the main valve 51.

As shown in FIG. 3, the main valve 51 is a disk-shaped member that has an opening part 51H on the second radially inner side and elastically deforms. For example, a metal such as iron can be used as a material of the main valve 51.

As shown in FIG. 4, the communication part 80 penetrates through the opening part 51H of the main valve 51. In addition, the main valve 51 is sandwiched between the main valve seat 52 and a spacer member 684 (described later) on the second radially inner side. Further, the main valve 51 faces the second axially outer side of the main valve seat 52.

A position of the main valve 51 configured as described above is restricted from moving in the second radial direction by the communication part 80. In addition, a second radially inner side of the main valve 51 is restricted from moving in the second axial direction by the main valve seat 52 and the spacer member 684 (described later). On the other hand, a second radially outer side of the main valve 51 is deformable to be movable in the second axial direction. Further, the main valve 51 throttles the flow of oil in a main flow passage 53, which will be described later, of the main valve seat 52 to generate a damping force.

Next, the main valve seat 52 will be described.

As shown in FIG. 3, the main valve seat 52 is a cylindrical member having an opening part 52H on the second radially inner side. Further, the communication part 80 is inserted into a part of the opening part 52H of the main valve seat 52 (see FIG. 4).

As shown in FIG. 5, the main valve seat 52 includes a central seat part 520 around the opening part 52H. In addition, the main valve seat 52 includes an inner seat part 521 (an example of a first seat part) provided on a second radially outer side of the central seat part 520, and an outer seat part 522 (an example of a second seat part) provided on a second radially outer side of the inner seat part 521. Further, the main valve seat 52 includes the main flow passage 53 penetrating in the second axial direction on a second radially outer side of the opening part 52H.

The central seat part 520 protrudes in an arc shape toward a main valve 51 side (the second axially outer side in the present embodiment). Further, a portion of the main valve 51 on the second radially inner side faces the central seat part 520.

The inner seat part 521 is formed in an annular shape. The inner seat part 521 protrudes toward the main valve 51 side from a flow passage port 532. In addition, in the first embodiment, a protruding height of the inner seat part 521 is substantially equal to that of the central seat part 520 and the outer seat part 522.

The outer seat part 522 is formed in an annular shape. Further, the outer seat part 522 protrudes toward the main valve 51 side from the flow passage port 532. The inner seat part 521 and the outer seat part 522 form a contact portion with the main valve 51 (see FIG. 4).

The inner seat part 521 according to the first embodiment has a plurality of groove parts 521T (an example of a circulation part) formed along the second radial direction. A flow passage cross sectional area of each groove part 521T is formed to be relatively small. That is, the groove part 521T constitutes a so-called orifice flow passage. Further, each of the groove parts 521T forms a path through which oil flows from the second radially inner side of the inner seat part 521 to the second radially outer side of the inner seat part 521 in a state in which the main valve 51 is in contact with the inner seat part 521. That is, each groove part 521T allows oil from the main flow passage 53 to flow between the inner seat part 521 and the outer seat part 522 while the main valve 51 is in contact with the inner seat part 521.

The main flow passage 53 forms a parallel flow passage with respect to a back pressure flow passage 77 and low speed flow passages 78 to be described later of a control valve seat 75 (see FIG. 4). The plurality of main flow passages 53 according to the first embodiment are provided (see FIG. 5). A flow passage port 531 on the second axially inner side of each main flow passage 53 communicates with the opening part 52H and faces the connection flow passage part 90. In addition, the flow passage port 532 (an example of a flow passage port) on the second axially outer side of each main flow passage 53 is positioned between the central seat part 520 and the inner seat part 521.

(Damping Force Adjusting Part 60)

As shown in FIG. 3, the damping force adjusting part 60 includes an advancing and retreating part 61 that advances and retreats the control valve 70 to be described later with respect to the control valve seat 75, a cap part 67 that covers various components such as the main valve part 50, and a back pressure generating mechanism 68 that changes ease of deformation of the main valve 51 with respect to the main valve seat 52. In addition, the damping force adjusting part 60 includes the control valve 70 that throttles and controls the flow of oil in the communication part 80, the control valve seat 75 that faces the control valve 70 and is in contact with the control valve 70, and a throttle member 79 that throttles the flow of the oil.

Advancing And Retreating Part 61

As shown in FIG. 2, the advancing and retreating part 61 includes a solenoid part 62 for advancing and retracting a plunger 64 using an electromagnet, a compression coil spring 63 provided between a pressing member 65 and the control valve 70, a plunger 64 that advances and retracts along the second axial direction, and the pressing member 65 that presses the control valve 70 against the control valve seat 75. In addition, the advancing and retreating part 61 includes a solenoid case 60C that accommodates and supports the components constituting the advancing and retreating part 61.

When the electromagnet is energized, the solenoid part 62 pushes the plunger 64 toward a pressing member 65 side.

The compression coil spring 63 contacts the control valve 70 on the second axially inner side and contacts the pressing member 65 on the second axially outer side. Further, the compression coil spring 63 applies forces in a direction in which the pressing member 65 and the control valve 70 are separated from each other to the pressing member 65 and the control valve 70, respectively.

The plunger 64 is pushed out toward the pressing member 65 when the solenoid part 62 is in an energized state, and is pulled back by the compression coil spring 63 when the solenoid part 62 is in a non-energized state.

As shown in FIG. 3, the pressing member 65 includes a valve contact part 651 protruding toward the control valve 70 side (second axially inner side). The valve contact part 651 according to the first embodiment is formed in an annular shape. Further, the valve contact part 651 is formed at a position facing a second facing part 72 (see FIG. 6A and FIG. 6B described later) of the control valve 70. The valve contact part 651 contacts the second facing part 72.

The pressing member 65 (an example of a pressing part) includes a groove part 653 (an example of a groove part) on the second axially outer side. The groove part 653 allows oil to flow between the pressing member 65 and the cap part 67 in a state in which the pressing member 65 moves to the second axially outer side and is in contact with the cap part 67.

In the first embodiment, a flow passage cross sectional area of the oil in the groove part 653 is set to increase an oil pressure of a back pressure chamber 68P, which will be described later, to be constant or higher when the solenoid part 62 (an example of an operation part) is in the non-energized state. Further, the flow passage cross sectional area of the oil in the groove part 653 is set such that the oil flows through the groove part 653 to an extent that the main valve 51 opens the main flow passage 53 to cause the flow of oil when the solenoid part 62 (the example of the operation part) is in the non-energized state.

A configuration in which the flow of oil between the cap part 67 and the pressing member 65 when the solenoid part 62 is in the non-energized state is not limited to the groove part 653. For example, by providing a groove part in the cap part 67, the flow of oil between the pressing member 65 and the cap part 67 may be made possible in the state in which the pressing member 65 is in contact with the cap part 67. The groove part may be formed in the cap part 67 and the groove part 653 may be provided in the pressing member 65. Further, the configuration that cases the flow of oil between the cap part 67 and the pressing member 65 in the state in which the pressing member 65 is in contact with the cap part 67 is not limited to the groove part, and may be a through hole.

Cap Part 67

As shown in FIG. 3, the cap part 67 includes a first opening part 67H1 formed on the second axially inner side and a second opening part 67H2 formed on the second axially outer side, and is a component having a generally cylindrical shape. In addition, a first inner diameter of the first opening part 67H1 is larger than a second inner diameter of the second opening part 67H2. Further, a plurality of inner diameter parts having different inner diameters are formed inside the cap part 67. In the cap part 67 according to the first embodiment, among the plurality of inner diameter parts, an inner diameter part provided on the second axially inner side is formed to have a larger inner diameter larger than an inner diameter part provided on the second axially outer side.

As shown in FIG. 4, the cap part 67 (an example of an accommodation part) accommodates the main valve part 50, the damping force adjusting part 60, and the communication part 80 therein. More specifically, the cap part 67 accommodates the main valve 51 (an example of a valve) of the main valve part 50 and the control valve 70 (an example of a back pressure control valve) for controlling a back pressure of the back pressure chamber 68P (described later) in the damping force adjusting part 60. In addition, as will be described later, a part of the cap part 67 forms the back pressure chamber 68P together with the back pressure generating mechanism 68 and the control valve seat 75.

The cap part 67 is provided with the plunger 64 penetrating the second opening part 67H2. In addition, in the cap part 67, the pressing member 65 advances and retreats with respect to the second opening part 67H2 inside the cap part 67.

As shown in FIG. 2, the cap part 67 is fixed by being sandwiched between the solenoid case 60C and the connection flow passage part 90. In addition, the cap part 67 forms a cap flow passage 67R through which oil flows between the cap part 67 and the solenoid case 60C. The cap flow passage 67R communicates with the second opening part 67H2 and also communicates with an in-housing flow passage 111 to be described later.

Back Pressure Generating Mechanism 68

As shown in FIG. 3, the back pressure generating mechanism 68 includes a partition wall member 681 (an example of a back pressure chamber formation part) provided on a side (that is, the second axially outer side) opposite to the main valve seat 52 from the main valve 51, and a seal member 682 that seals (that is, liquid-tightly) between the cap part 67 and the partition wall member 681. Further, the back pressure generating mechanism 68 includes a return spring 683 that applies a force to press the partition wall member 681 against the main valve 51 to the partition wall member 681, and spacer members 684 that are interposed between the return spring 683 and the main valve 51.

A general shape of the partition wall member 681 is formed in a substantially annular shape. As shown in FIG. 4, a gap C1 in the second radial direction is formed between the partition wall member 681 and the cap part 67. Further, the partition wall member 681 is movable in the second axial direction. For example, when the main valve 51 deforms toward the second axially outer side, the partition wall member 681 moves to the second axially outer side. In addition, when the main valve 51 is deformed toward the second axially inner side, the partition wall member 681 moves to the second axially inner side.

The partition wall member 681 according to the first embodiment includes a main valve contact part 681V that contacts the main valve 51 and a seal contact part 681S in which the seal member 682 is provided.

The main valve contact part 681V (an example of a contact part) is provided on the second axially inner side of the partition wall member 681. The main valve contact part 681V according to the first embodiment is formed so as to gradually decrease in a width from the second axially outer side toward the second axially inner side. The main valve contact part 681V contacts the main valve 51 in an annular shape. Further, the partition wall member 681 constitutes one of the components forming the back pressure chamber 68P that causes an oil pressure (hereinafter referred to as the back pressure) from the second axially outer side, which is opposite to the main valve seat 52, to act on the main valve 51.

Here, the back pressure chamber 68P is a chamber in which oil flows into the back pressure chamber 68P to cause an oil pressure corresponding to the inflow oil to act on the main valve 51. Further, the back pressure chamber 68P acts on the main valve 51 so as to apply a force for pressing the main valve 51 against the main valve seat 52. Incidentally, the back pressure chamber 68P according to the first embodiment is formed of the cap part 67, the partition wall member 681, the seal member 682, the spacer members 684, and the control valve seat 75.

As shown in FIG. 4, the main valve contact part 681V partially contacts the main valve 51 in the second radial direction of the main valve 51. As a result, a range in which the back pressure is applied to the main valve 51 is from an end part of the spacer member 684 on the second radially outer side to the main valve contact part 681V in the second radial direction. That is, the back pressure is not applied to the second axially outer side of the main valve contact part 681V of the main valve 51.

In the first embodiment, the main valve contact part 681V is in contact with the main valve 51 on a second radially outer side of a facing portion of the inner seat part 521 and on a second radially inner side of a facing portion of the outer seat part 522.

Here, when opening the main flow passage 53, the main valve 51 opens from the second radially outer side. Further, the outer damping part 100 according to the first embodiment is configured such that the main valve contact part 681V is in contact with the second radially inner side of the facing portion of the outer seat part 522. Therefore, the outer damping part 100 according to the first embodiment has a structure in which the ease of deformation of the main valve 51 when the main valve 51 is separated from the outer seat part 522 by the flow of the oil from the main flow passage 53 can be adjusted. That is, the outer damping part 100 according to the first embodiment includes the main valve contact part 681V, so that the damping force characteristics generated by the main valve 51 can be adjusted.

The partition wall member 681 according to the first embodiment can easily adjust the ease of deformation of the main valve 51 by changing a contact portion of the main valve contact part 681V with respect to the main valve 51. As described above, the partition wall member 681 according to the first embodiment is configured to increase a degree of freedom in design.

The seal contact part 681S includes a first surface S1, which is a surface facing the second radially outer side, and a second surface S2, which is a surface facing the second axially outer side.

An outer diameter of the first surface S1 is smaller than an inner diameter of the seal member 682. Accordingly, in the first embodiment, a gap C2 is formed between an inner peripheral surface 682N of the seal member 682 and the first surface S1 (outer peripheral surface).

In the first embodiment, by forming the gap C2 between the inner peripheral surface 682N and the first surface S1, the oil pressure in the back pressure chamber 68P is applied to the inner peripheral surface 682N of the seal member 682. Further, in the first embodiment, an outer peripheral surface 682G of the seal member 682 is pressed against an inner peripheral surface of the cap part 67 by the oil pressure applied to the inner peripheral surface 682N of the seal member 682.

The second surface S2 is a surface formed in an annular shape. Further, an end surface 682T of the seal member 682 is in contact with the second surface S2. In particular, in the first embodiment, the end surface 682T of the seal member 682 is pressed against the second surface S2 of the partition wall member 681 by the return spring 683.

As shown in FIG. 3, the seal member 682 is formed in an annular shape. In addition, an elastically deformable resin material such as engineering plastic or rubber can be used for the seal member 682.

Then, as shown in FIG. 4, the seal member 682 seals between the partition wall member 681 and the cap part 67. More specifically, the outer peripheral surface 682G of the seal member 682 is in contact with an inner periphery of the cap part 67. In addition, the end surface 682T of the seal member 682 on the second axially inner side is in contact with the second surface S2 of the partition wall member 681. Therefore, the seal member 682 prevents the oil in the back pressure chamber 68P from flowing out of the back pressure chamber 68P through a space between the partition wall member 681 and the cap part 67.

As shown in FIG. 3, the return spring 683 includes an annular part 683R formed in an annular shape, and a plurality of arm parts 683A protruding toward the second radially outer side from the annular part 683R. In addition, an elastic member such as a metal can be used as a material of the return spring 683.

As shown in FIG. 4, in the return spring 683, the communication part 80 penetrates through the annular part 683R, and the annular part 683R is sandwiched by the plurality of spacer members 684 in the second axial direction. In addition, the arm part 683A of the return spring 683 contacts the seal member 682.

In the return spring 683 according to the first embodiment, a position at which the annular part 683R is fixed by the spacer member 684 and a position at which the arm part 683A contacts the seal member 682 are different in the second axial direction. Each of the arm parts 683A has a shape inclined with respect to the second axial direction. Further, the arm part 683A is in contact with a corner part of the seal member 682 on the second radially inner side and on the second axially outer side. Accordingly, the arm part 683A applies a spring force of a component along the second axial direction and a spring force of a component along the second radial direction to the seal member 682.

First, the arm part 683A of the return spring 683 applies a force toward a partition wall member 681 (an example of the back pressure chamber formation part) side of the back pressure generating mechanism 68 with respect to the seal member 682 by the force of the component along the second axial direction. As a result, the return spring 683 presses the partition wall member 681 against the main valve 51 via the seal member 682.

The arm part 683A of the return spring 683 (an example of an elastic member) according to the first embodiment presses the seal member 682 (an example of a seal part) against the cap part 67 (an example of the accommodation part) by the force of the component along the second radial direction. As a result, in the first embodiment, a sealing performance between the seal member 682 and the cap part 67 is improved.

In the return spring 683 according to the first embodiment, the arm part 683A is also in contact with the partition wall member 681. Further, the return spring 683 applies a spring force of a component along the second axial direction and a spring force of a component along the second radial direction to the partition wall member 681.

First, the arm part 683A presses the partition wall member 681 against the main valve 51 by the spring force of the component along the second axial direction. In addition, the arm part 683A applies a force toward the second radially outer side to the partition wall member 681 by the spring force of the component along the second radial direction. In the first embodiment, the plurality of arm parts 683A are provided in a peripheral direction (see FIG. 3). Therefore, the arm parts 683A position the partition wall member 681 at predetermined positions in the second radial direction.

Control Valve 70

Figure 6A:
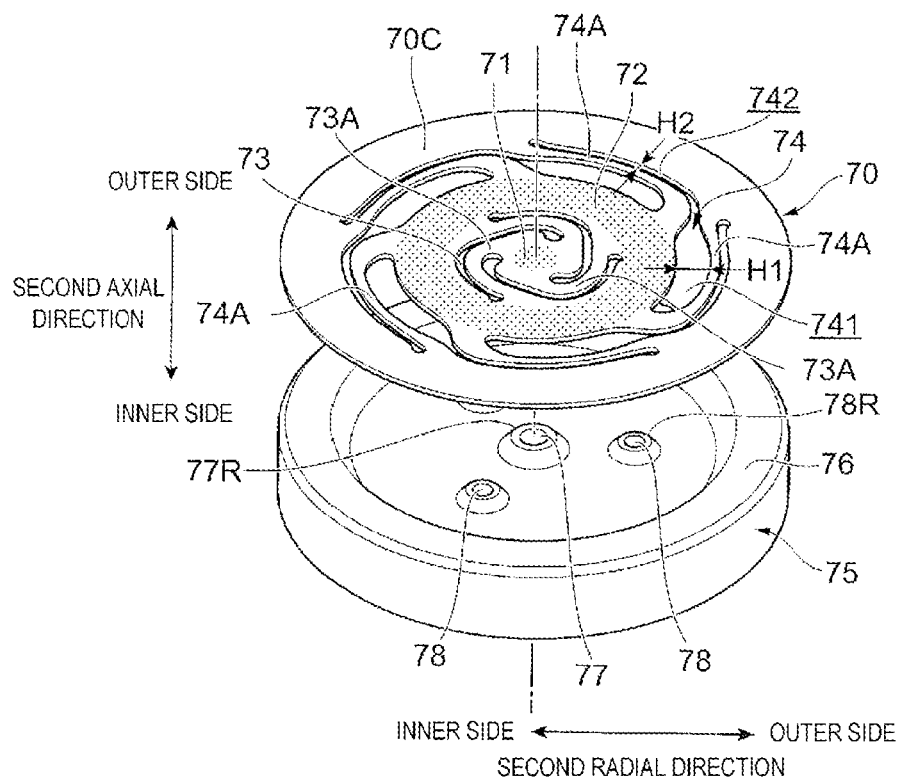
FIG. 6A and FIG. 6B are explanatory views of a control valve and a control valve seat according to the first embodiment.
Figure 6B:
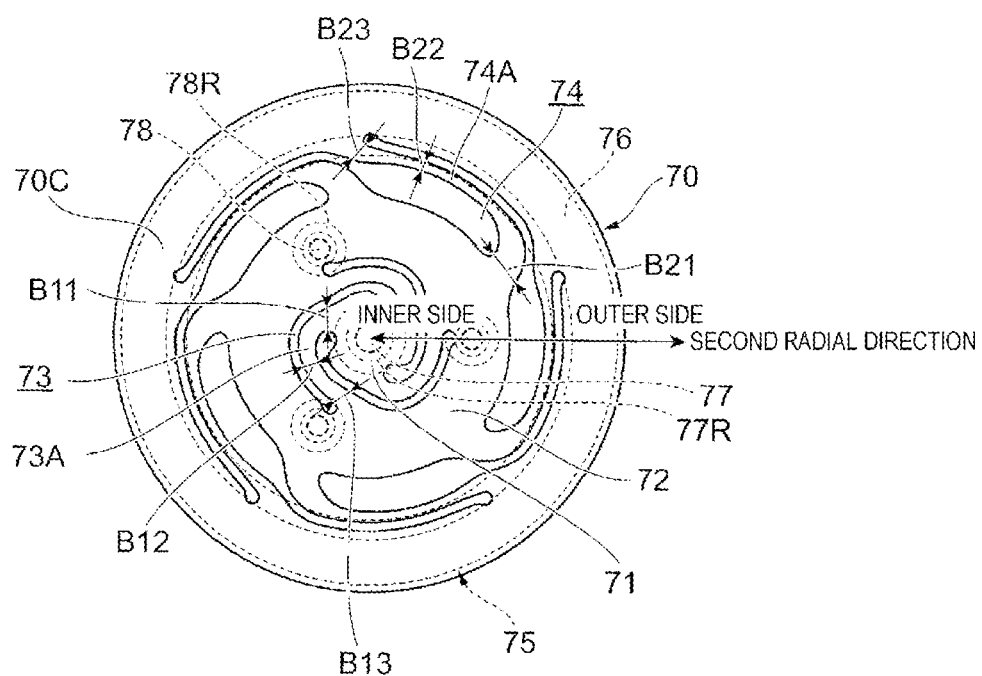

FIG. 6A and FIG. 6B are explanatory views of the control valve 70 and the control valve seat 75 according to the first embodiment.

As shown in FIG. 6A, the control valve 70 is a substantially circular plate-shaped member that elastically deforms. As a material of the control valve 70, for example, a metal such as iron can be used. The control valve 70 is provided so as to face the control valve seat 75 (an example of another flow passage formation part) on the second axially outer side.

Further, the control valve 70 (an example of a second valve) according to the first embodiment controls the flow of oil in the low speed flow passage 78 (an example of another flow passage) and the back pressure flow passage 77 (an example of the other flow passage), which are parallel to and different from the main flow passage 53 of the main valve part 50.

The control valve 70 includes an outer annular part 70C formed in an annular shape, a first facing part 71 facing the back pressure flow passage 77, and a second facing part 72 facing the low speed flow passages 78. Further, the control valve 70 includes an inner opening part 73 provided on the second radially inner side to facilitate deformation of the control valve 70 in the second axial direction, and an outer opening part 74 provided on the radially outer side of the inner opening part 73 to facilitate deformation of the control valve 70 in the second axial direction.

The outer annular part 70C is provided on the second radially outer side. Further, the outer annular part 70C functions as a part sandwiched between the cap part 67 and the control valve seat 75. The control valve 70 according to the first embodiment is held by the control valve seat 75 by the outer annular part 70C being sandwiched (see FIG. 4).

The first facing part 71 has a circular shape and is formed in a plate shape. Further, the first facing part 71 is formed to be larger than an inner diameter of the back pressure flow passage 77, and can cover a back pressure flow passage round 77R. In the first embodiment, the first facing part 71 is formed in a central part (that is, the second radially inner side) of the control valve 70.

The second facing part 72 has an annular shape and is formed in a plate shape. The second facing part 72 is formed to be larger than inner diameters of the low speed flow passages 78, and can cover low speed flow passage rounds 78R. The second facing part 72 is formed on the second radially outer side of the first facing part 71. In addition, the second facing part 72 is formed as an annular area in the control valve 70. Accordingly, in the first embodiment, regardless of a position of the control valve 70 in a peripheral direction with respect to the control valve seat 75, the second facing part 72 always faces the low speed flow passage 78.

The inner opening part 73 is provided to extend long in the peripheral direction of the control valve 70. In addition, the plurality of the inner opening parts 73 are provided. Further, an inner arm part 73A is formed between two adjacent inner opening parts 73. Each of the inner arm parts 73A is formed such that at least a part thereof extends along the peripheral direction. In the first embodiment, the plurality of inner arm parts 73A are formed in a spiral shape as a whole. In addition, in the control valve 70, the inner arm part 73A is provided on the second radially outer side of the first facing part 71 and on the second radially inner side of the second facing part 72. That is, the inner arm part 73A is provided between the first facing part 71 and the second facing part 72 in the second radial direction.

A width B11 of the inner arm part 73A on a side closer to the first facing part 71 is larger than a width B12 on a side far from the first facing part 71. Further, a width B13 of the inner arm part 73A on a side closer to the second facing part 72 is larger than the width B12 on a side far from the second facing part 72.

As shown in FIG. 6A, the outer opening part 74 is provided to extend in the peripheral direction of the control valve 70. The plurality of outer opening parts 74 are provided, and are arranged at substantially equal intervals in the peripheral direction. Further, in the control valve 70 according to the first embodiment, two different outer opening parts 74 are arranged so as to overlap each other in the second radial direction.

As shown in FIG. 6B, the outer opening part 74 is formed on the second radially outer side of the second facing part 72 and on the second radially inner side of the outer annular part 70C.

An outer arm part 74A is formed between two adjacent outer opening parts 74. Each of the outer arm parts 74A is formed such that at least a part thereof extends along the peripheral direction. In addition, in the first embodiment, the plurality of outer arm parts 74A are formed in a spiral shape as a whole. Further, in the control valve 70, the outer arm part 74A is provided on the second radially outer side of the second facing part 72 and on the radially inner side of the outer annular part 70C. That is, the outer arm part 74A is provided between the second facing part 72 and the outer annular part 70C in the second radial direction.

As shown in FIG. 6A, in each outer opening part 74, a width H1 of an inner area 741 formed on the second radially inner side of the outer arm part 74A is larger than a width H2 of an outer area 742 formed on the second radially outer side of the outer arm part 74A. Further, an area of an opening of the outer opening part 74 is the largest compared to the other openings formed in the control valve 70. In the first embodiment, the inner area 741 of the outer opening part 74 constitutes a main flow passage of the oil flowing through the control valve 70.

In the control valve 70 according to the first embodiment, the outer arm part 74A is arranged on the second radially outer side of the inner area 741 of the outer opening part 74 having a larger opening area. In the control valve 70 according to the first embodiment, when oil flows as will be described later, a flow speed on the second radially outer side is smaller than that on the second radially inner side. Therefore, in the first embodiment, the outer arm part 74A are arranged on the second radially outer side of the inner area 741 of the outer opening part 74, so that an influence of a dynamic pressure of oil flowing through the outer opening part 74 is reduced with respect to the outer arm part 74A configured to have a lower rigidity.

Further, as shown in FIG. 6B, a width B21 of the outer arm part 74A on a side closer to the second facing part 72 is larger than a width B22 on a side far from the second facing part 72. Further, a width B23 of the outer arm part 74A on a side closer to the outer annular part 70C is larger than the width B22 on a side far from the outer annular part 70C.

In the control valve 70 according to the first embodiment, a rigidity of a portion at which the inner arm part 73A and the outer arm part 74A are formed is reduced, and the portion at which the inner arm part 73A and the outer arm part 74A are formed is easily deformed. In particular, in the first embodiment, for example, the inner arm part 73A and the outer arm part 74A are formed so as to extend along the peripheral direction, respectively, length of the deformable arm is secured and the arm part is more easily deformed.

Control Valve Seat 75

As shown in FIG. 6A, the control valve seat 75 includes an outer seat part 76 that holds the control valve 70, the back pressure flow passage 77 that forms a flow passage of the oil for adjusting the oil pressure in the back pressure chamber 68P (see FIG. 4), and the low speed flow passage 78 that forms a flow passage of oil at a low speed.

As shown in FIG. 4, the control valve seat 75 includes a communication chamber 82 communicating with the back pressure flow passage 77, a back pressure communication passage 83 connecting the communication chamber 82 and the back pressure chamber 68P, and a low speed communication passage 85 connecting the low speed flow passage 78 and an inflow flow passage 81.

The communication chamber 82 communicates with a back pressure orifice flow passage 84 on the second axially inner side, communicates with the back pressure flow passage 77 on the second axially outer side, and faces the back pressure communication passage 83 in the second radial direction.

The back pressure communication passage 83 communicates with the communication chamber 82 on the second radially inner side and communicates with the back pressure chamber 68P on the second radially outer side.

A flow passage cross sectional area of the oil in the low speed communication passage 85 is larger than that of the low speed flow passage 78. In the first embodiment, the flow of oil at a low speed, which will be described later, is adjusted in the low speed flow passage 78. Therefore, the flow of the oil is not throttled on an upstream side of the low speed flow passage 78 in the flow of oil.

Throttle Member 79

As shown in FIG. 4, the throttle member 79 includes the back pressure orifice flow passage 84 connecting the inflow flow passage 81 and the communication chamber 82. The back pressure orifice flow passage 84 has a flow passage cross sectional area of oil smaller than that of the back pressure communication passage 83 and the back pressure flow passage 77. Further, the back pressure orifice flow passage 84 prevents the oil in the back pressure chamber 68P from returning to the inflow flow passage 81.

(Communication Part 80)

As shown in FIG. 3, the communication part 80 according to the first embodiment includes the inflow flow passage 81 through which oil from the communication passage L flows, and a connection part 89 connected to the control valve seat 75.

An inner diameter of the connection part 89 is substantially equal to an outer diameter of the control valve seat 75 on the second axially inner side. Further, an end part of the control valve seat 75 on the second axially inner side is inserted into the connection part 89. The communication part 80 may be configured to be inserted inside the control valve seat 75.

(Connection Flow Passage Part 90)

As shown in FIG. 2, the connection flow passage part 90 includes an inner flow passage 91 provided on the second radially inner side and an outer flow passage 92 provided on the second radially outer side.

The inner flow passage 91 communicates with the outer tubular body opening part 12H on the second axially inner side, and communicates with the inflow flow passage 81 of the communication part 80 and the main flow passage 53 of the main valve seat 52 on the second axially outer side.

The plurality of outer flow passages 92 are provided in the first embodiment. Further, the outer flow passage 92 communicates with the case opening part 13H on the second axially inner side and communicates with the in-housing flow passage 111 on the second axially outer side.

(Outer Housing 100C)

As shown in FIG. 2, the outer housing 100C is a substantially cylindrical member. The outer housing 100C is fixed to the damper case 13 on the second axially inner side by welding or the like, for example.

In addition, the outer housing 100C forms the in-housing flow passage 111, which is a flow passage of the oil in the outer housing 100C, on the second radially outer side of the main valve part 50 and the damping force adjusting part 60.

The oil that flows out of the second opening part 67H2 of the cap part 67 and the oil that flows out of the main flow passage 53 of the main valve seat 52 by opening the main valve 51 flow into the in-housing flow passage 111.

[Adjusting Operation of Damping Force Adjusting Part 60]

Next, an adjusting operation in the damping force adjusting part 60 will be described.

As shown in FIG. 4, the control valve 70 is pressed against the control valve seat 75 by pushing the pressing member 65 toward the second axially inner side. A pressing force of the pressing member 65 changes in accordance with an amount of current flowing through the solenoid part 62 (see FIG. 2).

For example, in the damping force adjusting part 60, a state in which the pressing force of the pressing member 65 is maximized is formed. At this time, the control valve 70 is most strongly pressed against the control valve seat 75. At this time, the valve contact part 651 of the pressing member 65 brings the second facing part 72 closer to the low speed flow passage 78 and presses the second facing part 72 against the low speed flow passage 78 (low speed flow passage round 78R).

The second facing part 72 according to the first embodiment is connected to the first facing part 71 via the inner arm part 73A. Therefore, as the valve contact part 651 of the pressing member 65 moves the second facing part 72, the first facing part 71 approaches the back pressure flow passage 77. The first facing part 71 (back pressure flow passage round 77R) is pressed against the back pressure flow passage 77. Here, in the first embodiment, the back pressure flow passage 77 protrudes higher than the low speed flow passage 78. Therefore, in the first embodiment, a state in which the back pressure flow passage 77 is pressed on more reliably is formed by the first facing part 71.

As described above, the first facing part 71 contacts the back pressure flow passage round 77R, and the back pressure flow passage 77 is closed. At the same time, the second facing part 72 contacts the low speed flow passage round 78R, and the low speed flow passage 78 is closed.

For example, in the damping force adjusting part 60, a state in which the pressing force of the pressing member 65 is minimized is formed. At this time, in the damping force adjusting part 60, the first facing part 71 is separated from the back pressure flow passage round 77R, and the back pressure flow passage 77 is opened. At the same time, the second facing part 72 is separated from the low speed flow passage round 78R, and the low speed flow passage 78 is opened.

For example, in the damping force adjusting part 60, a state between the state in which the pressing force of the pressing member 65 is minimized and the state in which the pressing force is maximized is set. In this state, in the damping force adjusting part 60, the first facing part 71 is farther away from the back pressure flow passage round 77R than in the state in which the pressing force is the largest, and comes closer to the back pressure flow passage round 77R than in the state in which the pressing force is the smallest. At the same time, the second facing part 72 is farther away from the low speed flow passage round 78R than in the state in which the pressing force is the largest, and comes closer to the low speed flow passage round 78R than in the state in which the pressing force is the smallest.

In the first embodiment described above, the low speed flow passage 78 has a lower protruding height than the back pressure flow passage 77, and the second facing part 72 facing the lower low speed flow passage 78 is pushed by the pressing member 65. On the other hand, in a case where the protruding height of the back pressure flow passage 77 is lower than that of the low speed flow passage 78, the first facing part 71 facing the lower back pressure flow passage 77 may be pushed by the pressing member 65.

Further, the valve contact part 651 of the pressing member 65 may be brought into contact with both the first facing part 71 and the second facing part 72 to advance and retreat with respect to the low speed flow passage 78 and the back pressure flow passage 77.

[Operation of Hydraulic Shock Absorber 1]

FIG. 7A and FIG. 7B are operation explanatory views of the hydraulic shock absorber 1 according to the first embodiment. Incidentally, FIG. 7A shows the flow of oil during an extension stroke, and FIG. 7B shows the flow of oil during a compression stroke.

First, an operation of the hydraulic shock absorber 1 in the extension stroke will be described.

As shown in FIG. 7A, during the extension stroke, the rod 20 moves toward the other side with respect to the cylinder 11. At this time, the piston valve 32 remains closed by the piston oil passage port 311. In addition, due to a movement of the piston part 30 toward the other side, a volume of the second oil chamber Y2 decreases. Further, the oil in the second oil chamber Y2 flows out from the cylinder opening 11H to the communication passage L.

The oil flows into the outer damping part 100 through the communication passage L and the outer tubular body opening part 12H. Further, in the outer damping part 100, first, the oil flows into the inner flow passage 91 of the connection flow passage part 90. Thereafter, in the outer damping part 100, the damping force is generated in the main valve 51 or the control valve 70. Incidentally, the flow of oil at this time will be described in detail later.

Thereafter, the oil that has flown through the main valve 51 or the control valve 70 flows out into the in-housing flow passage 111. Further, the oil flows from the case opening part 13H into the reservoir chamber R through the outer flow passage 92 of the connection flow passage part 90.

A pressure of the first oil chamber Y1 is relatively low with respect to the reservoir chamber R. Therefore, the oil in the reservoir chamber R flows into the first oil chamber Y1 through the bottom part 40.

Next, the operation of the hydraulic shock absorber 1 during the compression stroke will be described.

As shown in FIG. 7B, during the compression stroke, the rod 20 relatively moves to the one side with respect to the cylinder 11. In the piston part 30, the piston valve 32 that closes the piston oil passage port 311 is opened by a differential pressure between the first oil chamber Y1 and the second oil chamber Y2. The oil in the first oil chamber Y1 flows out into the second oil chamber Y2 through the piston oil passage port 311. Here, the rod 20 is arranged in the second oil chamber Y2. Therefore, the oil flowing from the first oil chamber Y1 into the second oil chamber Y2 becomes excessive by a volume of the rod 20. Therefore, an amount of oil corresponding to the volume of the rod 20 flows out from the cylinder opening 11H to the communication passage L.

The oil flows into the outer damping part 100 through the communication passage L and the outer tubular body opening part 12H. Incidentally, the flow of oil in the outer damping part 100 is the same as the flow of oil during the extension stroke described above. That is, in the hydraulic shock absorber 1 according to the first embodiment, a direction in which the oil flows in the outer damping part 100 is the same during both the compression stroke and the extension stroke.

As described above, in the hydraulic shock absorber 1 according to the first embodiment, the damping force is generated in the outer damping part 100 during both the compression stroke and the extension stroke.

Next, the flow of oil in the outer damping part 100 according to the first embodiment will be described in detail.

First, the flow of oil in a state in which the pressing force of the pressing member 65 is relatively small will be described. Hereinafter, an example of a state in which the control valve 70 is separated from the back pressure flow passage round 77R and the low speed flow passage round 78R will be described.

Figure 8A:
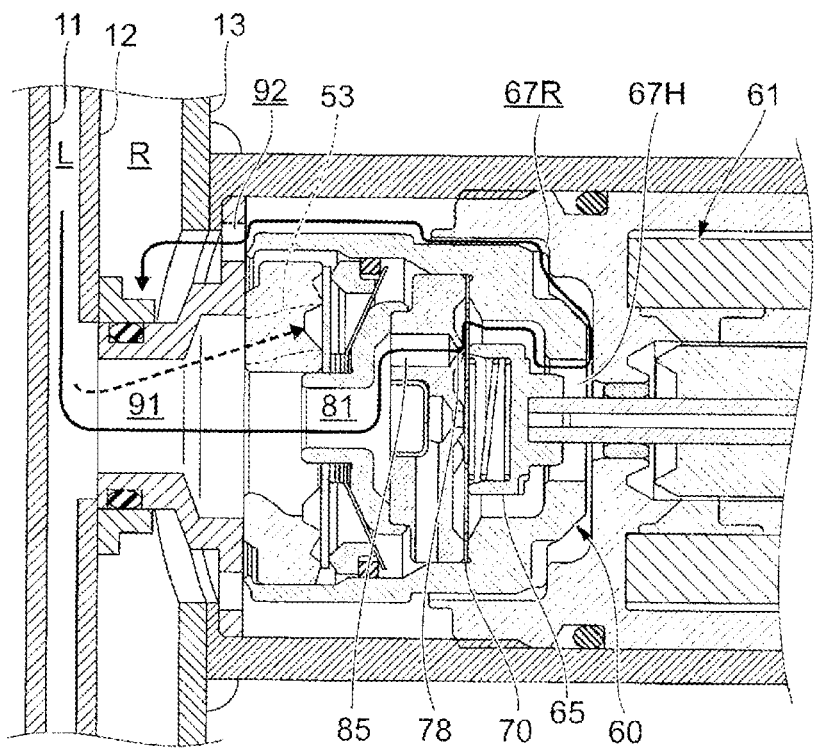
FIG. 8A and FIG. 8B are explanatory views of a flow of oil in the outer damping part according to the first embodiment.
Figure 8B:
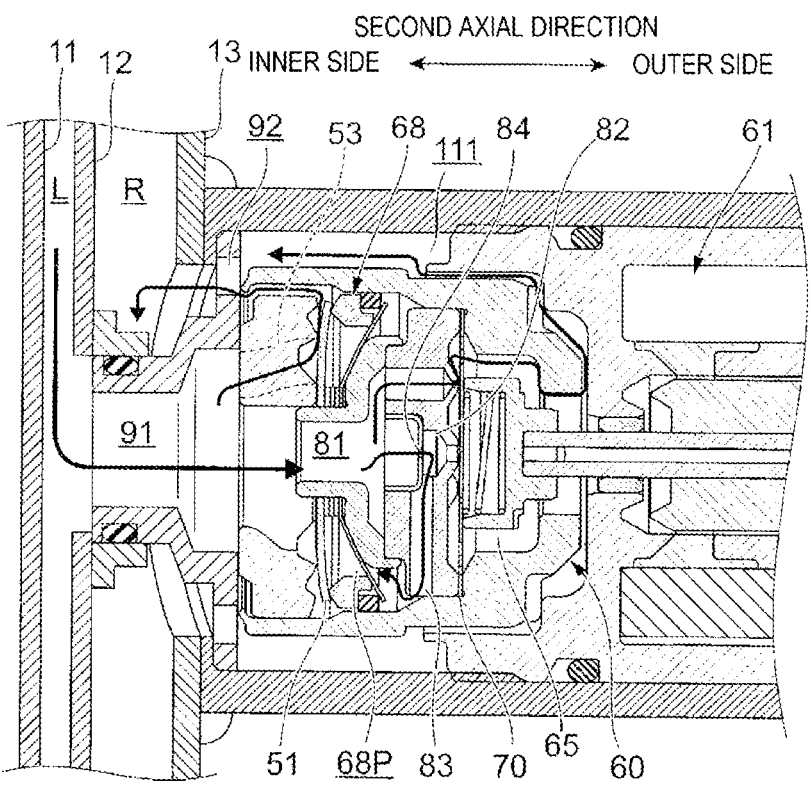

FIG. 8A and FIG. 8B are explanatory views of the flow of oil in the outer damping part 100 according to the first embodiment. Note that FIG. 8A shows the flow of oil at a low speed in the state in which the pressing force of the pressing member 65 is relatively small, and FIG. 8B shows the flow of oil at a high speed in the state in which the pressing force of the pressing member 65 is relatively small.

(at Low Speed)

As shown in FIG. 8A, in a case where a moving speed of the piston part 30 (see FIG. 1) is low, the oil flowing into the inner flow passage 91 flows into the inflow flow passage 81 and the main flow passage 53. Here, since the moving speed of the piston part 30 is low, the flow of the oil that opens the main valve 51 in the main flow passage 53 does not occur.

On the other hand, the oil that has flowed into the inflow flow passage 81 mainly flows in an order of the low speed communication passage 85, the low speed flow passage 78, the low speed flow passage round 78R, the outer opening part 74 (see FIG. 6A and FIG. 6B), the second opening part 67H2, and the cap flow passage 67R. Then, the oil flows out from the in-housing flow passage 111 to the reservoir chamber R.

As described above, in the case where the moving speed of the piston part 30 is low, the damping force is generated when the flow of the oil is throttled by a gap between the low speed flow passage round 78R of the low speed flow passage 78 and the control valve 70.

(at High Speed)

As shown in FIG. 8B, in a case where the moving speed of the piston part 30 (see FIG. 1) is high, the oil flowing into the inner flow passage 91 flows into the inflow flow passage 81 and the main flow passage 53. The oil flowing into the main flow passage 53 opens the main valve 51 and flows out into the reservoir chamber R.

Even when the moving speed is high, the oil that has flowed into the inflow flow passage 81 flows into the in-housing flow passage 111 while generating a differential pressure by reducing a flow rate by the gap between the low speed flow passage round 78R (see FIG. 6A and FIG. 6B) and the control valve 70, as in the case of the low speed, and further flows out into the reservoir chamber R.

As described above, in the case where the moving speed of the piston part 30 is high, the damping force is mainly generated by the flow of the oil in the main flow passage 53 of the main valve seat 52.

The oil that has flowed into the inflow flow passage 81 transmits the pressure to the back pressure chamber 68P through the back pressure orifice flow passage 84 and the back pressure communication passage 83. However, the back pressure flow passage 77 communicating with the back pressure chamber 68P is opened by the control valve 70. Therefore, the pressure of the back pressure chamber 68P is lower than that in the case where the control valve 70 is pressed against the back pressure flow passage 77. The main valve 51 in contact with the back pressure generating mechanism 68 is relatively easy to open the main flow passage 53. Therefore, in the state in which the pressing force of the pressing member 65 is relatively small, the damping force generated by the flow of oil in the main flow passage 53 that opens the main valve 51 is relatively small.

Next, the flow of oil in the state in which the pressing force of the pressing member 65 is relatively large will be described.

Hereinafter, an example of a state in which the control valve 70 is pressed against the back pressure flow passage round 77R and the low speed flow passage round 78R will be described.

Figure 9A:
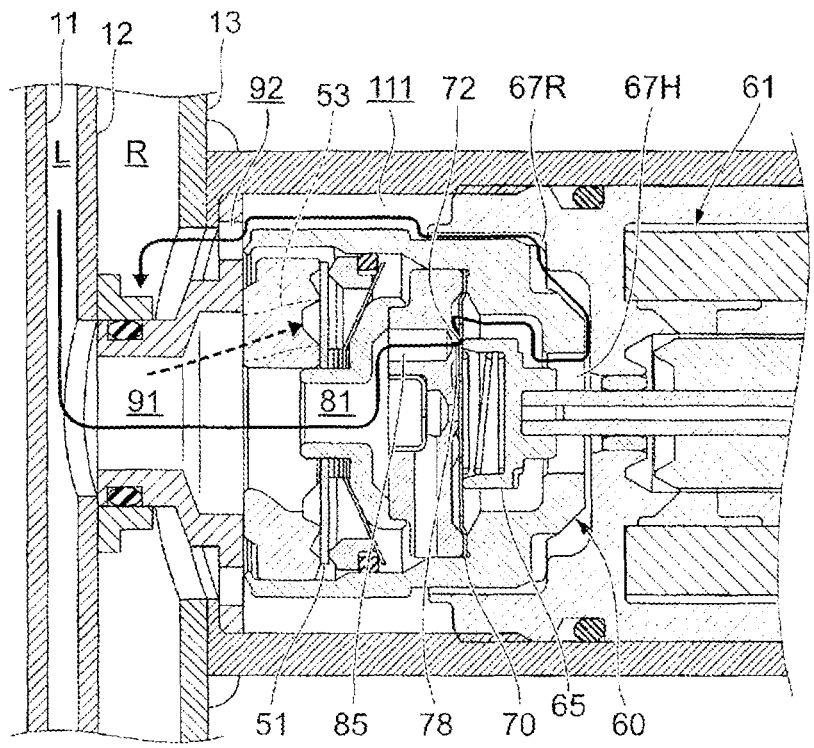
FIG. 9A and FIG. 9B are explanatory views of the flow of the oil in the outer damping part according to the first embodiment.
Figure 9B:
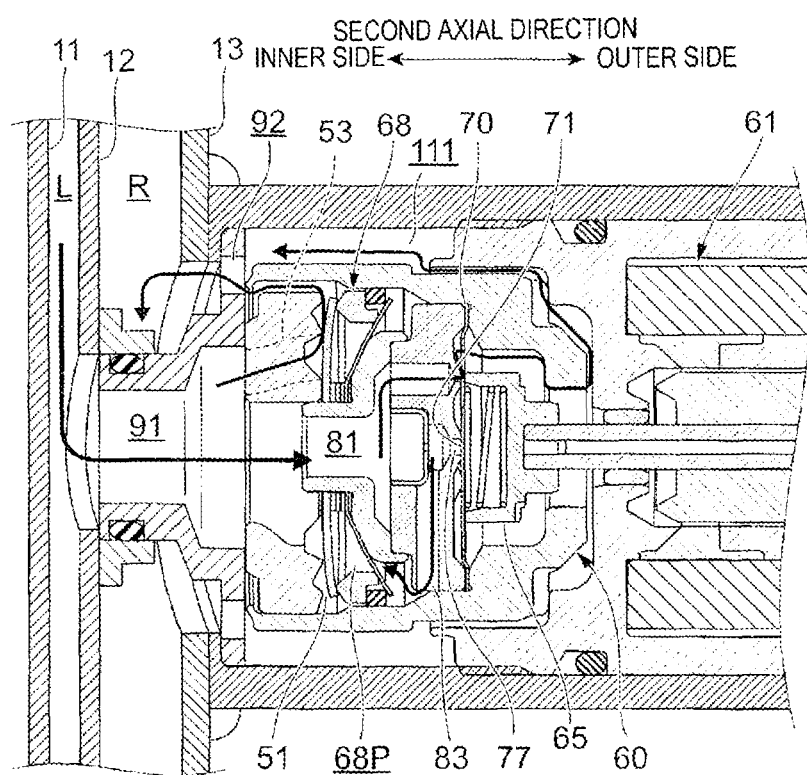

FIG. 9A and FIG. 9B are explanatory views of the flow of oil in the outer damping part 100 according to the first embodiment. Note that FIG. 9A shows the flow of oil at a low speed in the state in which the pressing force of the pressing member 65 is relatively large, and FIG. 9B shows the flow of oil at a high speed in the state in which the pressing force of the pressing member 65 is relatively large.

(at Low Speed)

As shown in FIG. 9A, in the case where the moving speed of the piston part 30 is low, the oil flowing into the inner flow passage 91 flows into the inflow flow passage 81 and the main flow passage 53. Here, since the moving speed of the piston part 30 is low, there is no flow of the oil flowing through the main flow passage 53 by opening the main valve 51.

On the other hand, the oil that has flowed into the inflow flow passage 81 passes through the low speed communication passage 85 and flows into the low speed flow passage 78. Then, the oil flows through the low speed flow passage 78 and the low speed flow passage round 78R (see FIG. 6A and FIG. 6B) while opening the control valve 70. Further, the oil flows mainly in an order of the outer opening part 74 (see FIG. 6A and FIG. 6B), the second opening part 67H2, and the cap flow passage 67R. Then, the oil flows out from the in-housing flow passage 111 to the reservoir chamber R.

As described above, in the case where the moving speed of the piston part 30 (see FIG. 1) is low, the damping force is generated by the oil flowing in the low speed flow passage round 78R of the control valve seat 75 while opening the control valve 70. The damping force when the oil flows through the low speed flow passage round 78R is higher than that in the case where the control valve 70 is separated from the low speed flow passage round 78R.

(at High Speed)

As shown in FIG. 9B, when the moving speed of the piston part 30 is high, the oil that has flowed in the inner flow passage 91 flows into the inflow flow passage 81 and the main flow passage 53. The oil flowing into the main flow passage 53 opens the main valve 51 and flows out into the reservoir chamber R.

Even when the moving speed is high, the oil that has flowed into the inflow flow passage 81 flows into the in-housing flow passage 111 while generating the differential pressure by reducing the flow rate by the gap between the low speed flow passage round 78R (see FIG. 6A and FIG. 6B) and the control valve 70, similarly to when the pressing force of the pressing member 65 is relatively small, and further flows out into the reservoir chamber R.

As described above, in the case where the moving speed of the piston part 30 is high, the damping force is mainly generated by the flow of the oil in the main flow passage 53 of the main valve seat 52.

The oil that has flowed into the inflow flow passage 81 transmits the pressure to the back pressure chamber 68P through the back pressure orifice flow passage 84 and the back pressure communication passage 83. The back pressure flow passage 77 communicating with the back pressure chamber 68P is in a state of being pressed by the control valve 70. Therefore, the pressure of the back pressure chamber 68P is higher than that in a case where the back pressure flow passage 77 is opened. Further, the main valve 51 in contact with the back pressure generating mechanism 68 is relatively difficult to open the main flow passage 53. Therefore, in the state in which the pressing force of the pressing member 65 is relatively high, the damping force generated by the flow of oil in the main flow passage 53 that opens the main valve 51 is relatively large.

As described above, in the hydraulic shock absorber 1 according to the first embodiment, by operating the pressing member 65, both adjustment of the damping force at the low speed and adjustment of the damping force at the high speed are performed. That is, in the hydraulic shock absorber 1 according to the first embodiment, by changing the pressing force of the control valve 70 with respect to the control valve seat 75 by the pressing member 65, a flow passage area of the low speed flow passage 78, which is the flow passage of the oil at the low speed, and a flow passage area of the back pressure flow passage 77 that adjusts the pressure of the back pressure chamber 68P related to the flow passage area of the oil at the high speed are adjusted.

In the hydraulic shock absorber 1 according to the first embodiment, the flow of oil in the back pressure flow passage 77 and the flow of oil in the low speed flow passage 78 can be simultaneously controlled by the single control valve 70. In particular, in the hydraulic shock absorber 1 according to the first embodiment, since the flow of oil at the low speed in the low speed flow passage 78 can be controlled, the adjustment can be made when the main valve 51 opens the main flow passage 53 (a so-called blow point), and finer control of the damping force is possible than in the related art.

In the operation example described above, two patterns of the state in which the pressing force of the pressing member 65 is relatively large and the state in which the pressing force of the pressing member 65 is relatively small have been described, but the present invention is not limited to the two patterns described above. The pressing force of the pressing member 65 can be optionally set within a range in which the pressing force of the pressing member 65 can be adjusted in accordance with the amount of current to the solenoid part 62. With this setting, the damping force adjusting part 60 according to the first embodiment can adjust the damping force at the low speed and the damping force at the high speed in a plurality of stages.

Next, the flow of oil when the solenoid part 62 is in the non-energized state will be described.

Figure 10A:
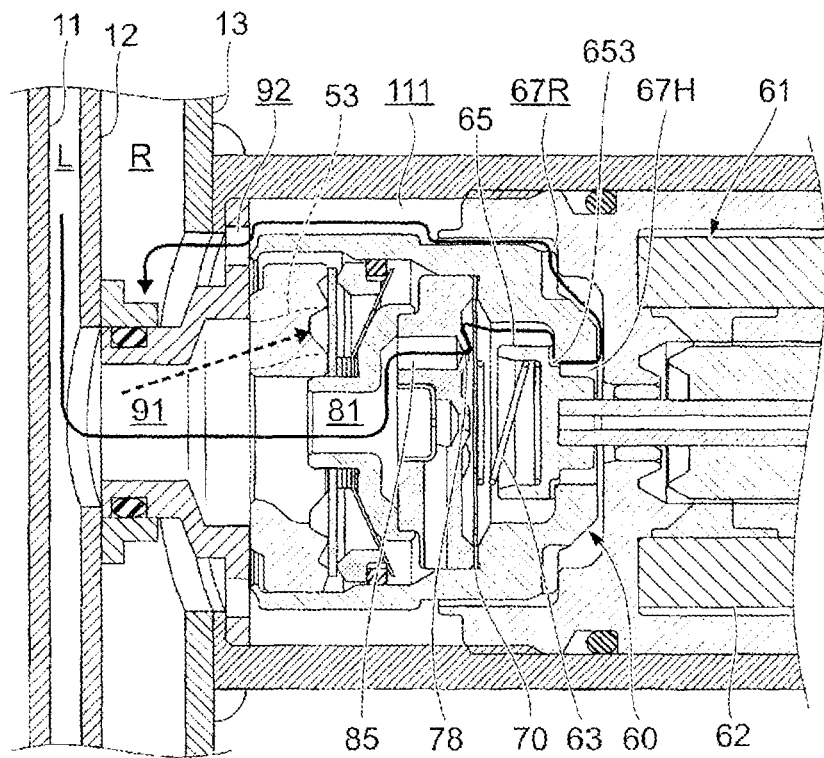
FIG. 10A and FIG. 10B are explanatory views of the flow of the oil in the outer damping part according to the first embodiment.
Figure 10B:
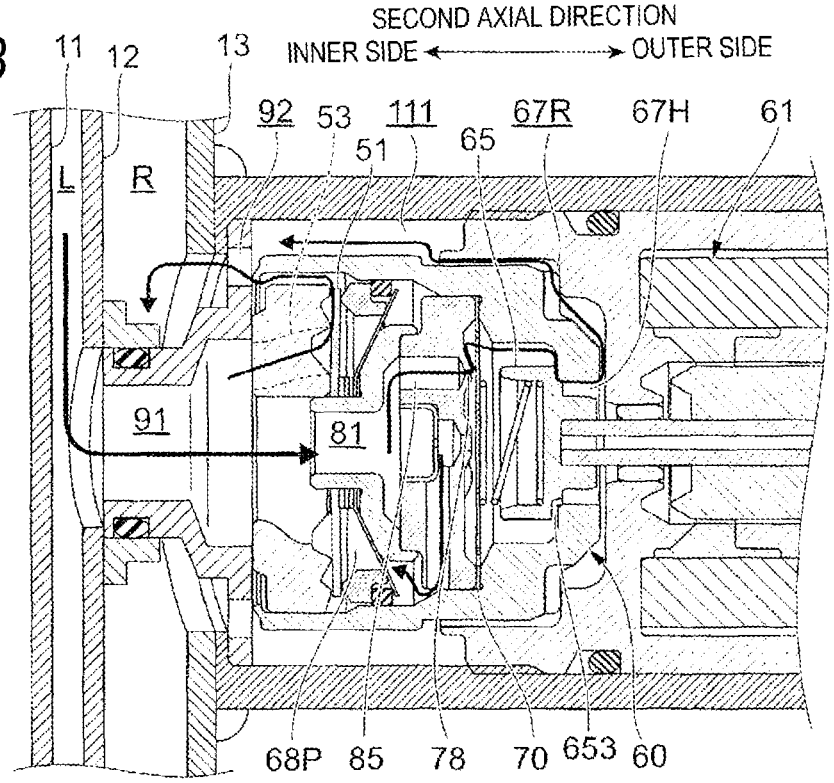

FIG. 10A and FIG. 10B are explanatory views of the flow of oil in the outer damping part 100. Note that FIG. 10A shows the flow of the oil at the low speed when the solenoid part 62 is in the non-energized state, and FIG. 10B shows the flow of the oil at the high speed when the solenoid part 62 is in the non-energized state.

As shown in FIG. 10A and FIG. 10B, when the solenoid part 62 is in the non-energized state, the compression coil spring 63 pushes the plunger 64 back to the second axially outer side. Accordingly, the pressing member 65 fixed to the plunger 64 is in a state of being pressed against the cap part 67.

(at Low Speed)

As shown in FIG. 10A, in the case where the moving speed of the piston part 30 is low, similarly to the flow of oil described with reference to FIG. 8A, the oil that has flowed into the inflow flow passage 81 flows in an order of the low speed communication passage 85, the low speed flow passage 78, the low speed flow passage round 78R, the inner opening part 73 or the outer opening part 74 (see FIG. 6A and FIG. 6B), the groove part 653 and the cap flow passage 67R. Then, the oil flows out into the in-housing flow passage 111.

Further, when the moving speed of the piston part 30 is low, the damping force is generated by the flow of oil in the groove part 653. In the first embodiment, the flow passage cross sectional area of the groove part 653 is smaller than that of the low speed flow passage 78. Therefore, the damping force generated by the flow of oil in the groove part 653 is larger than the damping force generated by the flow of oil in the low speed flow passage 78, for example.

(at High Speed)

As shown in FIG. 10B, in the case where the moving speed of the piston part 30 is high, similarly to the flow of oil described with reference to FIG. 8B, the oil that has flowed in the inner flow passage 91 flows into the inflow flow passage 81 and the main flow passage 53. The oil that has flowed into the main flow passage 53 opens the main valve 51 and flows out into the in-housing flow passage 111.

Even when the moving speed is high, the oil that has flowed into the inflow flow passage 81 flows into the in-housing flow passage 111 while generating a differential pressure by reducing the flow rate by the groove part 653, as in the case of the low speed, and further flows out into the reservoir chamber R.

As described above, in the case where the moving speed of the piston part 30 is high, the damping force is mainly generated by the flow of the oil in the main flow passage 53 of the main valve seat 52.

Here, the oil that has flowed into the inflow flow passage 81 transmits the pressure to the back pressure chamber 68P through the back pressure orifice passage 84 and the back pressure communication passage 83. The back pressure chamber 68P communicates with the in-housing flow passage 111 via the back pressure flow passage 77. Here, the flow of oil between the back pressure chamber 68P and the in-housing flow passage 111 needs to pass through the groove part 653. When the flow of the oil is throttled by the groove part 653, outflow of the oil from the back pressure chamber 68P is suppressed, and the pressure of the back pressure chamber 68P is maintained relatively high. Further, the main valve 51 in contact with the partition wall member 681 is relatively difficult to open the main flow passage 53. Therefore, when the solenoid part 62 is in the non-energized state, the damping force generated by the flow of the oil in the main flow passage 53 that opens the main valve 51 is relatively large.

As described above, in the hydraulic shock absorber 1 according to the first embodiment, both the damping force at the low speed and the damping force at the high speed are made relatively high even when the solenoid part 62 is not energized.

Next, the damping force generated by the main valve part 50 according to the first embodiment will be described in detail.

Figure 11:
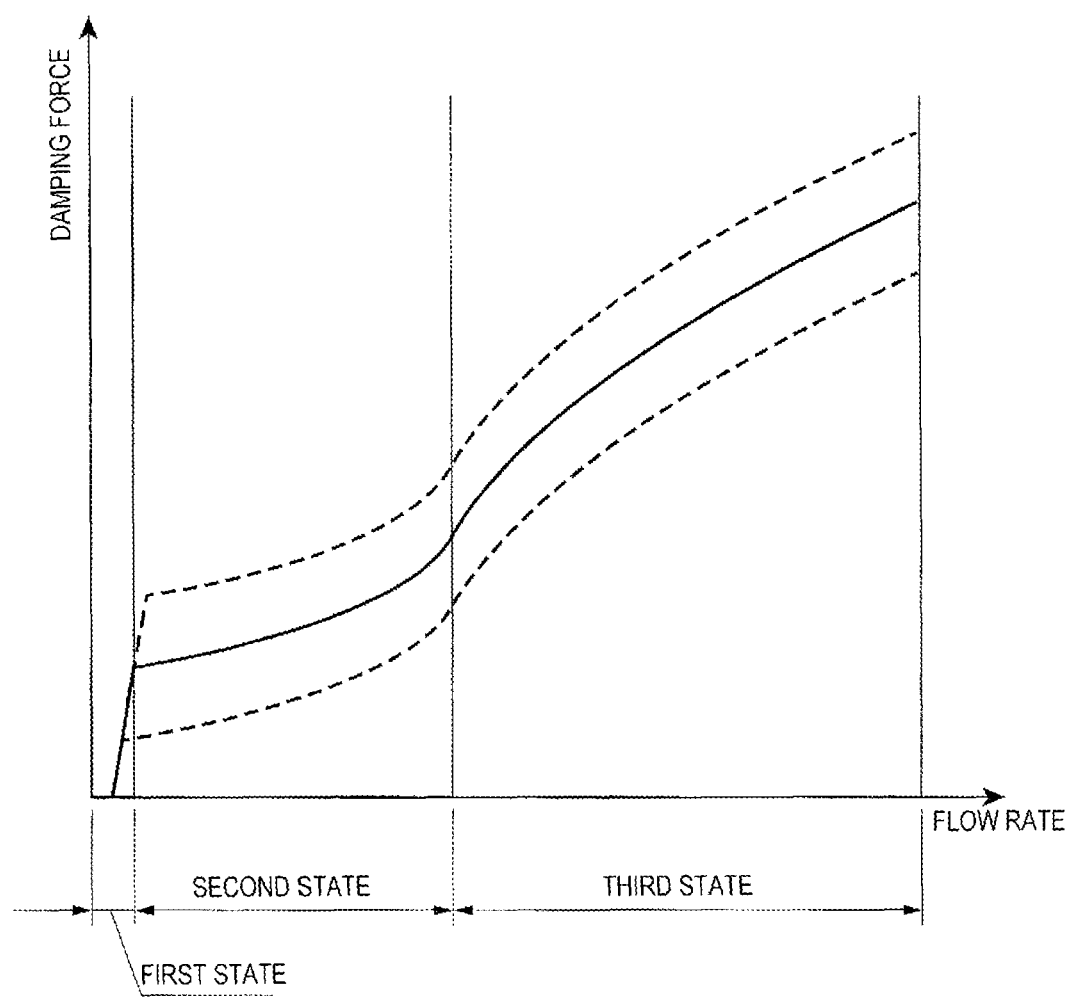
FIG. 11 is an explanatory view of damping force characteristics of the main valve part according to the first embodiment.

FIG. 11 is an explanatory view of the damping force characteristics of the main valve part 50 according to the first embodiment.

The main valve seat 52 includes the central seat part 520, the inner seat part 521, and the outer seat part 522 (see FIG. 4 and FIG. 5). Further, the groove part 521T is provided in the inner seat part 521. Therefore, the oil flowing through the main flow passage 53 provided on the second radially inner side of the inner seat part 521 first flows between the central seat part 520 and the inner seat part 521. Further, the oil flows between the inner seat part 521 and the outer seat part 522 through the groove part 521T. At this time, the main valve 51 is in contact with both the inner seat part 521 and the outer seat part 522 (hereinafter, referred to as a first state).

Thereafter, after the first state, the oil accumulates between the inner seat part 521 and the outer seat part 522, so that the main valve 51 is separated from the outer seat part 522 (hereinafter, referred to as a second state). At this time, a flow passage cross sectional area of the oil between the main valve 51 and the outer seat part 522 is smaller than that of the oil in the groove part 521T. Therefore, in the second state, the damping force having orifice characteristics is exhibited.

Thereafter, when the flow rate increases and the oil flows from the main flow passage 53, the main valve 51 is separated from the inner seat part 521 (hereinafter, referred to as a third state). At this time, the flow passage cross sectional area of the oil between the main valve 51 and the outer seat part 522 is equal to or larger than the flow passage cross sectional area of the oil in the groove part 521T.

As shown in FIG. 11, the damping force characteristics of the main valve part 50 according to the first embodiment are as follows. The first state is from a state in which the main valve 51 is in contact with both the inner seat part 521 and the outer seat part 522 to a state in which a slight gap is generated between the main valve 51 and the outer seat part 522. That is, the first state is a state in which only a minute outflow is generated from a state in which there is no outflow of oil to the outside. Therefore, the damping force generated in the first state is the smallest.

In the second state in which the main valve 51 is in contact with the inner seat part 521 and is separated from the outer seat part 522, a pressure receiving area of the main valve 51 extends from the center seat part 520 to the outer seat part 522 in the second radial direction (see FIG. 4). Therefore, the damping force generated in the second state is higher than the first state and lower than the third state. In addition, in the second state, the amount of change in the damping force corresponding to the flow rate is smaller than that in the first state and the third state.

In the third state in which the main valve 51 is separated from both the inner seat part 521 and the outer seat part 522, the pressure receiving area of the main valve 51 extends from the central seat part 520 to the inner seat part 521 in the second radial direction (see FIG. 4). Therefore, the damping force generated in the third state is higher than the first state and the second state. In addition, in the third state, the amount of change in the damping force corresponding to the flow rate is smaller than the first state and larger than the second state.

As described above, in the main valve part 50 according to the first embodiment, by using one main valve 51 for at least one main valve seat 52, the damping force characteristics in which the damping force changes stepwise in accordance with the flow rate is realized.

In particular, in the main valve part 50 according to the first embodiment, the damping force characteristics described above are realized by the main valve 51 and the main valve seat 52 having a relatively simple structure.

Next, a manufacturing method for the hydraulic shock absorber 1 according to the first embodiment will be described. An assembling method of the outer damping part 100 according to the first embodiment will be specifically described below.

As shown in FIG. 3, when assembling the outer damping part 100 according to the first embodiment, first, the cap part 67 is prepared. Then, the plunger 64 to which the pressing member 65 is attached is inserted from the first opening part 67H1 side of the cap part 67, and is passed through the second opening part 67H2. Then, the compression coil spring 63 is fitted into the pressing member 65. Further, the control valve 70, the control valve seat 75, and the throttle member 79 are inserted in this order from the first opening part 67H1 side of the cap part 67. In the first embodiment, the control valve seat 75 is inserted into the cap part 67.

The communication part 80 is inserted from the first opening part 67H1 side of the cap part 67, and an end part of the control valve seat 75 on the second axially inner side is inserted into the connection part 89. Then, the spacer member 684 and the return spring 683 are attached to the communication part 80. The seal member 682, the partition wall member 681, and the main valve 51 are inserted in this order from the first opening part 67H1 side of the cap part 67, and these components are attached. Then, the main valve seat 52 is inserted from the first opening part 67H1 side of the cap part 67, and the communication part 80 is inserted into the opening part 52H of the main valve seat 52.

As described above, the main valve part 50 and the damping force adjusting part 60 are integrated by accommodating various components inside the cap part 67.

The various components accommodated inside the cap part 67 can be held in the cap part 67 by swaging the end part of the cap part 67 on the second axially inner side, by screwing the main valve seat 52 to the cap part 67, or by press-fitting the main valve seat 52 into the cap part 67.

Further, as shown in FIG. 2, the main valve part 50 and the damping force adjusting part 60, which are integrated by the cap part 67, and connection flow passage part 90 are inserted in this order from the second axially outer side of the outer housing 100C. Further, the solenoid case 60C is inserted from the second axially outer side of the outer housing 100C, and the solenoid case 60C is fixed to the outer housing 100C by screw fastening, press-fitting, or the like. Then, by fitting the solenoid part 62 into the solenoid case 60C, the assembly of the outer damping part 100 is completed.

The outer damping part 100 having completed the assembly is attached so that the connection flow passage part 90 penetrates the outer connection part 12J of the outer tubular body 12, and is fixed to the damper case 13 by welding or the like, for example.

As described above, in the hydraulic shock absorber 1 according to the first embodiment, the main valve 51 constituting the main valve part 50 and the control valve 70 constituting the damping force adjusting part 60 are accommodated inside the cap part 67. In this way, by employing a configuration in which the main valve 51 and the control valve 70 are collectively accommodated in one cap part 67, the cap part 67 can be handled as a unit, so that ease of assembly of the hydraulic shock absorber 1 can be improved.

First Modification

Next, the hydraulic shock absorber 1 to which a first modification is applied will be described.

Figure 12A:
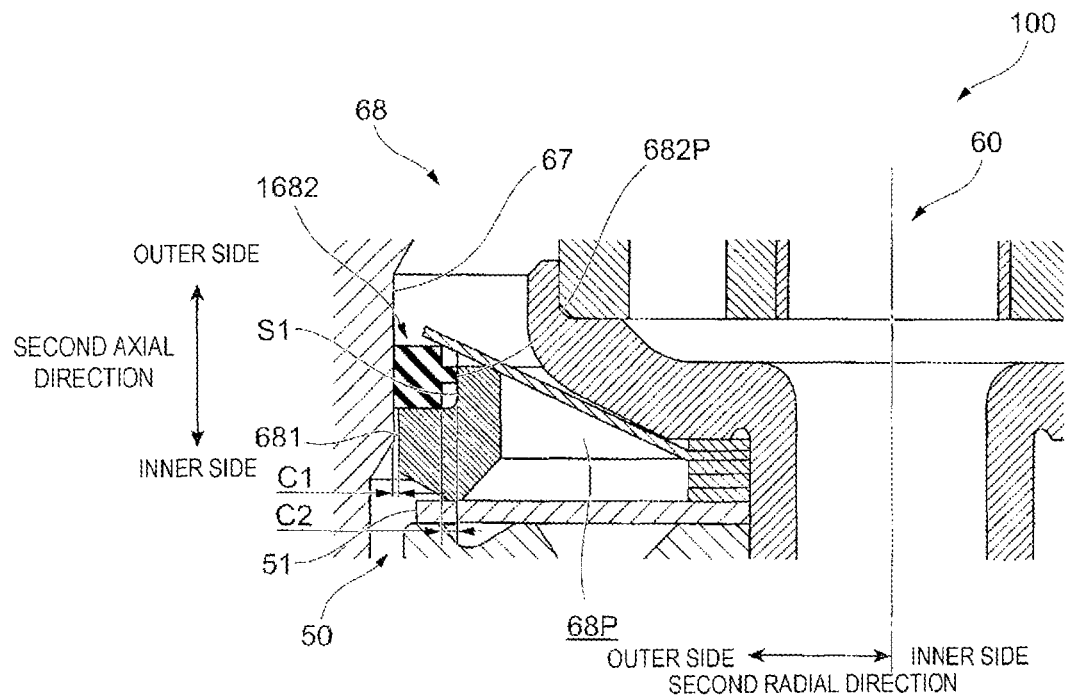
FIG. 12A and FIG. 12B are explanatory views of a hydraulic shock absorber according to a first modification.
Figure 12B:
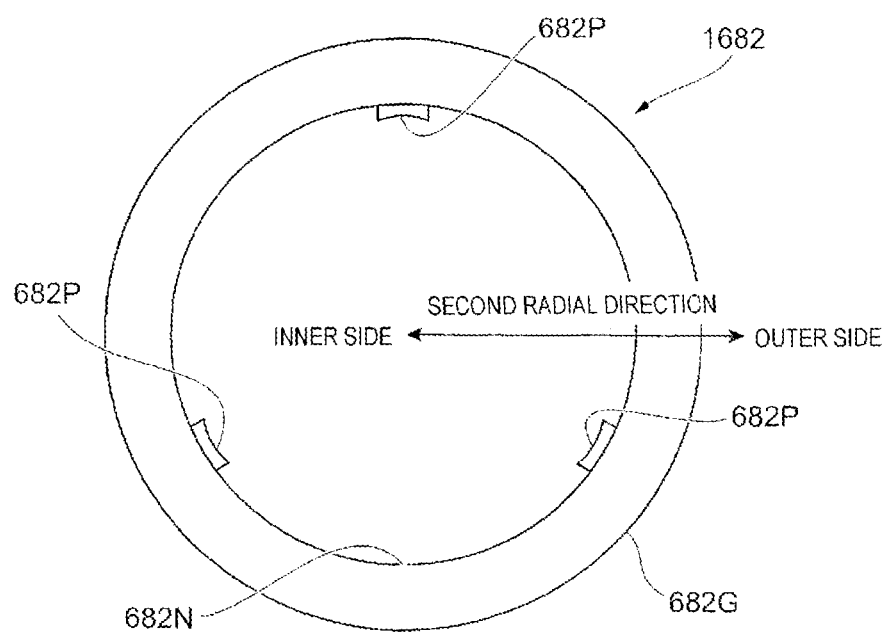

FIG. 12A and FIG. 12B are explanatory views of the hydraulic shock absorber 1 according to the first modification. Note that FIG. 12A is a partial sectional view of the main valve part 50 and the damping force adjusting part 60 according to the first modification, and FIG. 12B is a top view of the seal member 682 according to the first modification.

As shown in FIG. 12A, the outer damping part 100 according to the first modification includes a seal member 1682 instead of the seal member 682.

A basic configuration of the seal member 1682 is similar to that of the seal member 682. However, the seal member 1682 has a plurality of protruding parts 682P (an example of protruding part) protruding toward the second radially inner side from the inner peripheral surface 682N. The plurality of protruding parts 682P are provided at substantially equal intervals in a peripheral direction of the seal member 1682.

Further, as shown in FIG. 12B, the seal member 1682 is provided such that the protruding part 682P is in contact with the first surface S1 of the partition wall member 681.

As described with reference to FIG. 4, in the outer damping part 100, the gap C2 is provided between the seal member 1682 and the partition wall member 681, so that the seal member 1682 is pressed against the inner periphery of the cap part 67. However, the partition wall member 681 also has the gap C1 with respect to the cap part 67 so as to prevent occurrence of galling or the like with respect to the cap part 67 even if the main valve 51 floats on one side and the partition wall member 681 is tilted together with the main valve 51. Accordingly, the partition wall member 681 may also move in the second radial direction. Therefore, in the outer damping part 100 according to the first modification, the partition wall member 681 is positioned on the second radially inner side by the protruding part 682P of the seal member 1682.

Second Modification

Next, the hydraulic shock absorber 1 to which a second modification is applied will be described.

Figure 13:
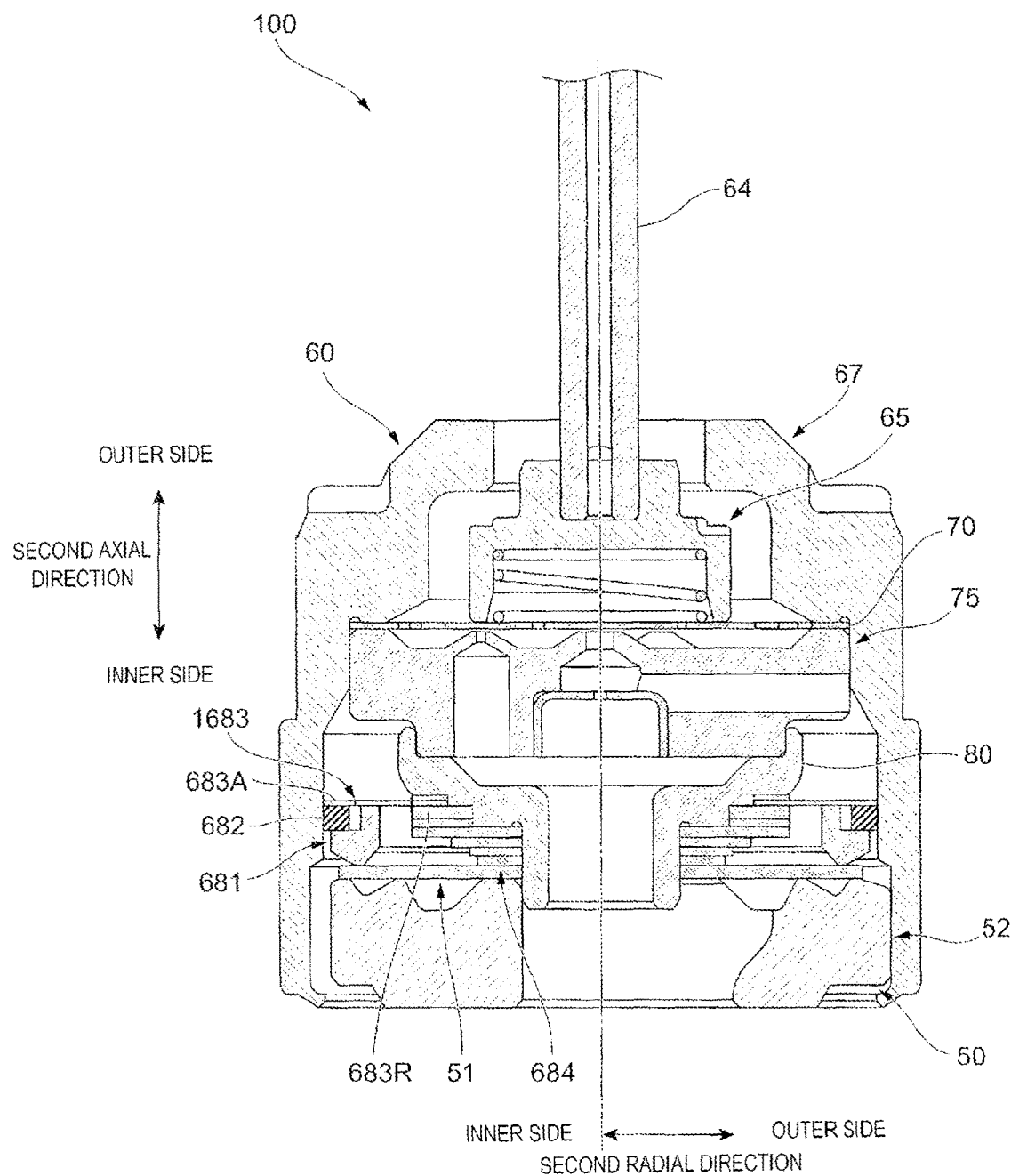
FIG. 13 is an explanatory view of a hydraulic shock absorber 1 according to a second modification.

FIG. 13 is an explanatory view of the hydraulic shock absorber 1 according to the second modification.

As shown in FIG. 13, the outer damping part 100 according to the second modification includes a return spring 1683 instead of the return spring 683.

A basic configuration of the return spring 1683 is the same as that of the return spring 683. However, in the return spring 1683, a position of the annular part 683R fixed by the spacer member 684 and a position of the arm part 683A in contact with the seal member 682 are substantially the same in the second axial direction.

In the outer damping part 100 according to the second modification, when the main valve 51 is deformed and moved to the second axially outer side, the spring force of the return spring 1683 acts on the seal member 682 and the partition wall member 681. Accordingly, in the hydraulic shock absorber 1 according to the second modification, the return spring 1683 is not always maintained in a deformed state, but is deformed only when the main valve 51 operates. Further, in the outer damping part 100 according to the second modification, the return spring 1683 is suppressed from being plastically deformed.

Second Embodiment

Next, the hydraulic shock absorber 1 according to a second embodiment will be described.

Figure 14:
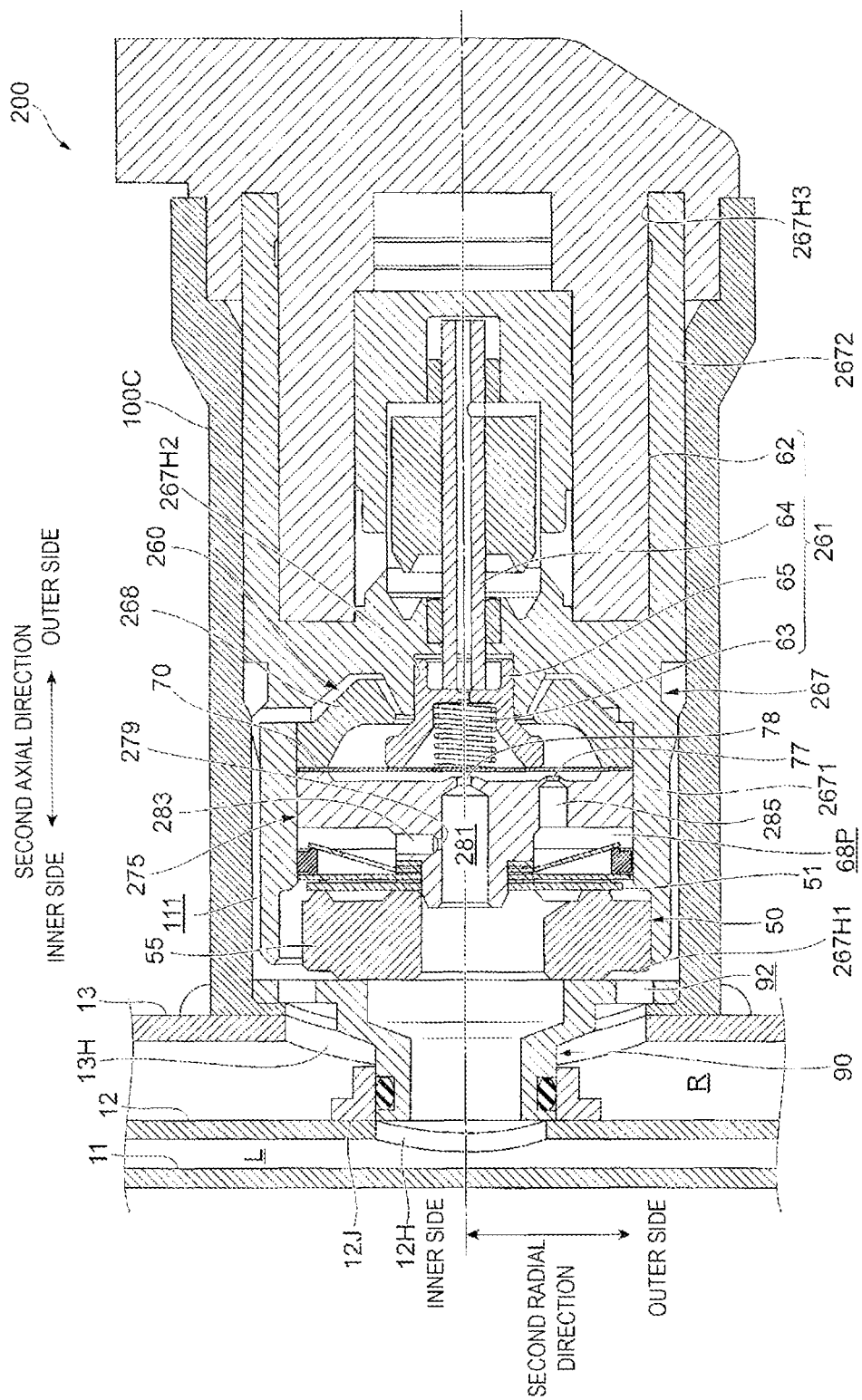
FIG. 14 is a sectional view of an outer damping part according to a second embodiment.

FIG. 14 is a sectional view of an outer damping part 200 according to the second embodiment.

Figure 15:
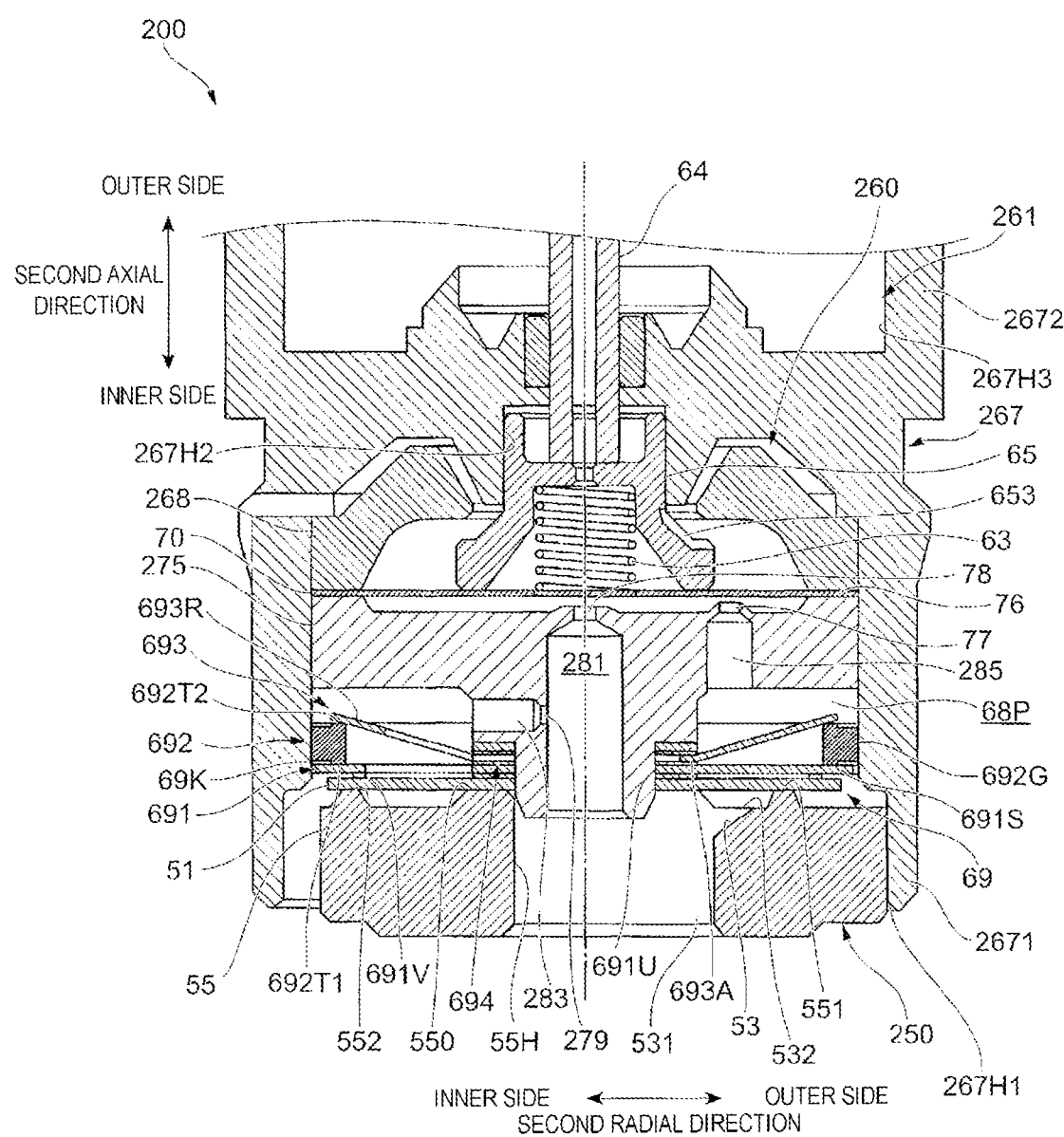
FIG. 15 is a partial sectional view of a main valve part and a damping force adjusting part according to the second embodiment.

FIG. 15 is a partial sectional view of a main valve part 250 and a damping force adjusting part 260 according to the second embodiment.

Figure 16:
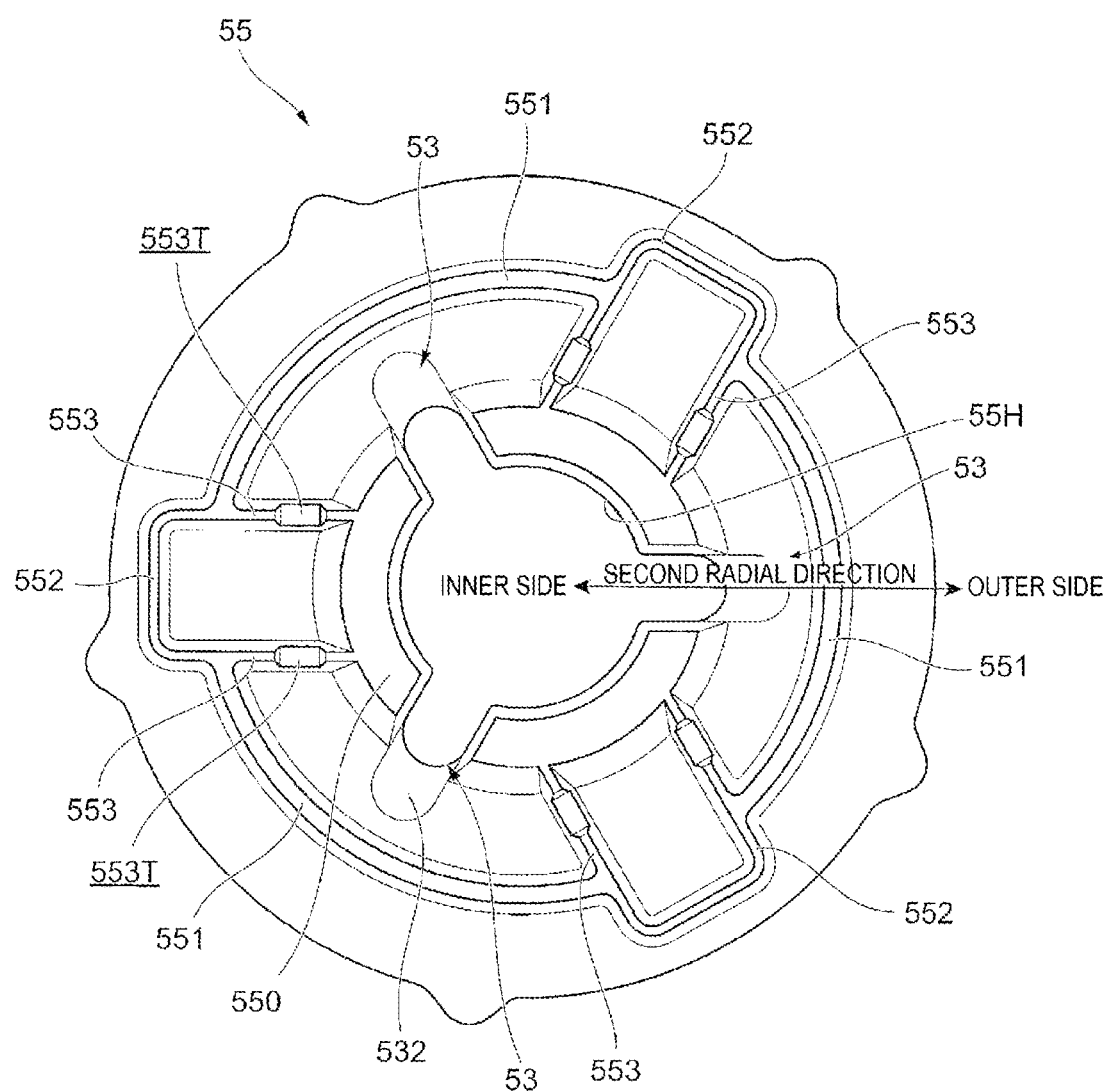
FIG. 16 is an explanatory view of a main valve seat according to the second embodiment.

FIG. 16 is an explanatory view of the main valve seat 55 according to the second embodiment.

Figure 17:
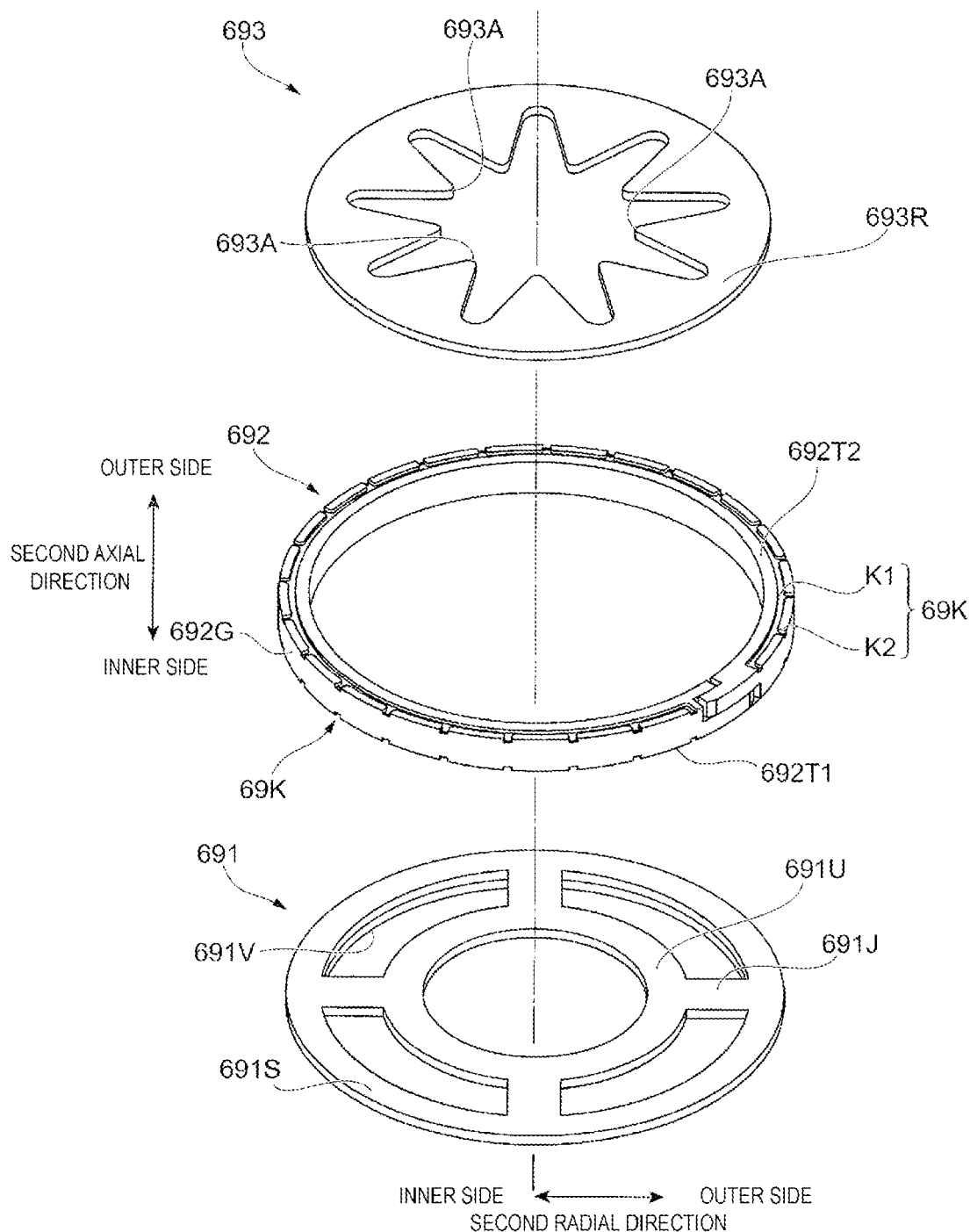
FIG. 17 is an explanatory view of a back pressure formation part according to the second embodiment.

FIG. 17 is an explanatory view of a back pressure generating mechanism 69 according to the second embodiment.

In the description of the second embodiment, the same configuration as those in the first embodiment are denoted by the same reference numerals, and a detailed description thereof will be omitted.

As shown in FIG. 14, the outer damping part 200 includes a main valve part 250 that mainly generates a damping force in the hydraulic shock absorber 1 according to the second embodiment, and a damping force adjusting part 260 that adjusts a magnitude of the damping force generated by the outer damping part 200. Further, the outer damping part 200 includes the connection flow passage part 90 that forms the flow passage of oil from the communication passage L with respect to the main valve part 250, and the outer housing 100C that accommodates various components constituting the outer damping part 200.

(Main Valve Part 250)

As shown in FIG. 15, the main valve part 250 includes the main valve 51 that generates the damping force by controlling the flow of oil so as to be throttled, and the main valve seat 55 that faces the main valve 51 and is in contact with the main valve 51.

As shown in FIG. 16, the main valve seat 55 is a columnar member that has an opening part 55H on the second radially inner side. An inflow part 281 of a control valve seat 275 to be described later is inserted into a part of the opening part 55H of the main valve seat 55 (see FIG. 15).

As shown in FIG. 16, the main valve seat 55 includes a central seat part 550 around the opening part 55H. The main valve seat 55 includes inner seat parts 551 provided on a second radially outer side of the center seat part 550 and outer seat parts 552 provided on second radially outer sides of the respective inner seat parts 551. Further, the main valve seat 55 includes common parts 553 on the second radially outer side of the center seat part 550 and on the second radially inner sides of the respective inner seat parts 551.

Further, the main valve seat 55 includes the main flow passage 53 penetrating in the second axial direction on the second radially outer side of the opening part 55H.

The central seat part 550 is formed in an arc shape. The central seat part 550 protrudes from the flow passage port 532 toward the main valve 51 side (second axially outer side in the present embodiment). Further, a portion of the main valve 51 on second radially the inner side faces the central seat part 550.

The inner seat part 551 is formed in an arc shape. The inner seat part 551 protrudes toward the main valve 51 side from the flow passage port 532. In addition, in the second embodiment, a protruding height of the inner seat part 551 is substantially equal to the central seat part 550 and the outer seat part 552.

The outer seat part 552 is formed in a U shape. The outer seat part 552 protrudes toward the main valve 51 side from the flow passage port 532. In the main valve seat 55 according to the second embodiment, the inner seat part 551 and the outer seat part 552 are connected.

The common part 553 (an example of a common part) protrudes linearly toward the main valve 51 side. In addition, each of the common parts 553 extends substantially parallel to the second radial direction. The common part 553 is connected to a connection portion between the central seat part 550, the inner seat part 551, and the outer seat part 552. Further, the common part 553 is used in common by the inner seat part 551 and the outer seat part 552, and forms a portion in contact with the main valve 51.

In the main valve seat 55 according to the second embodiment, each common part 553 includes a groove part 553T (an example of a circulation part). A flow passage cross sectional area of each groove part 553T is formed to be relatively small. That is, the groove part 553T constitutes a so-called orifice flow passage. Each groove part 553T allows oil flowing between the central seat part 550 and the inner seat part 551 from the main flow passage 53 to flow between the central seat part 550 and the outer seat part 552 in a state in which the main valve 51 is in contact with the common part 553.

As shown in FIG. 15, the main flow passage 53 forms a parallel flow passage with respect to the back pressure flow passage 77 and the low speed flow passage 78 of the control valve seat 275. In addition, the plurality of main flow passages 53 according to the second embodiment are provided. The flow passage port 531 on the second axially inner side of each main flow passage 53 communicates with the opening part 55H and faces the connection flow passage part 90. In addition, the flow passage port 532 on the second axially outer side of each main flow passage 53 is positioned between the central seat part 550 and the inner seat part 551 (see FIG. 16).

In the main valve part 250 according to the second embodiment configured as described above, similarly to the main valve part 50 according to the first embodiment, the damping force characteristics in which the damping force changes stepwise in accordance with the flow rate is realized.

(Damping Force Adjusting Part 260)

As shown in FIG. 15, the damping force adjusting part 260 includes an advancing and retreating part 261 that advances and retreats the control valve 70 with respect to the control valve seat 275, and the back pressure generating mechanism 69 that changes the ease of deformation of the main valve 51 with respect to the main valve seat 55. The damping force adjusting part 260 includes a cap part 267 that covers various components such as the main valve part 50, the control valve 70, and the control valve seat 275. Further, the damping force adjusting part 260 includes a valve holding member 367 that supports the control valve 70 on the second axially outer side of the control valve 70.

A basic configuration of the damping force adjusting part 260 according to the second embodiment is the same as that of the damping force adjusting part 60 according to the first embodiment. However, the cap part 267 of the damping force adjusting part 260 according to the second embodiment is different from the cap part 67 according to the first embodiment.

As shown in FIG. 14, the cap part 267 (an example of the accommodation part) according to the second embodiment includes a first opening part 267H1 formed on the second axially inner side, a second opening part 267H2 formed on the second axially outer side of the first opening part 267H1, and a third opening part 267H3 formed on the second axially outer side of the second opening part 267H2. Further, the cap part 267 includes a first cap part 2671 that is a part from the first opening part 267H1 to the second opening part 267H2 in the second axial direction, and a second cap part 2672 that is a part from the second opening part 267H2 to the third opening part 267H3 in the second axial direction.

The first cap part 2671 is formed in a generally cylindrical shape. A first inner diameter of the first opening part 267H1 is larger than a second inner diameter of the second opening part 267H2. Further, a plurality of inner diameter parts having different inner diameters are formed inside the first cap part 2671, respectively. In the first cap part 2671, among the plurality of inner diameter parts, the inner diameter part provided on the second axially inner side is formed to have an inner diameter larger than an inner diameter part provided on the second axially outer side. Further, the first cap part 2671 accommodates at least the main valve 51 (an example of the valve) of the main valve part 250 and the control valve 70 (an example of the back pressure control valve).

The second cap part 2672 (an example of an expansion accommodation part) is formed in a generally cylindrical shape. A third inner diameter of the third opening part 267H3 is larger than the second inner diameter of the second opening part 267H2. The second cap part 2672 is formed so as to expand from the first cap part 2671 by extending from the second opening part 267H2 toward the second axially outer side. Further, the second cap part 2672 accommodates the solenoid part 62 (an example of the operation part) and the plunger 64.

The cap part 267 according to the second embodiment configured as described above is not configured by a plurality of divided components, but accommodates the solenoid part 62, the plunger 64, the main valve 51 of the main valve part 250, and the control valve 70 alone.

In addition, a part of the cap part 267 according to the second embodiment forms the back pressure chamber 68P together with the back pressure generating mechanism 69 and the control valve seat 275.

Also in the second embodiment, by collectively accommodating the main valve 51 and the control valve 70 in a single cap part 267, the cap part 267 can be handled as a unit, so that the ease of assembly of the hydraulic shock absorber 1 can be improved.

The pressing member 65 according to the second embodiment includes the groove part 653. The groove part 653 according to the second embodiment allows oil to flow between the pressing member 65 and the valve holding member 367 or the cap part 267 in a state in which the pressing member 65 moves to the second axially outer side and contacts the valve holding member 367 or the cap part 267 when the solenoid part 62 is in the non-energized state.

In the second embodiment as well, a groove part or a through hole may be provided in the valve holding member 367 or the cap part 267 in order to cause the oil to flow between the valve holding member 367 or the cap part 267 and the pressing member 65 when the solenoid part 62 is in the non-energized state.

Back Pressure Generating Mechanism 69

As shown in FIG. 15, the back pressure generating mechanism 69 includes a contact member 691 provided on an opposite side (second axially outer side) to the main valve seat 55 with respect to the main valve 51, and a seal member 692 that seals between the cap part 267 and the contact member 691. Further, the back pressure generating mechanism 69 includes a return spring 693 that applies a force for pressing the contact member 691 and the seal member 692 against the main valve 51 to the contact member 691 and the seal member 692, and a spacer member 694 interposed between the return spring 693 and the control valve seat 275.

As shown in FIG. 17, the contact member 691 is an elastic member made of a metal such as iron. The contact member 691 includes an inner annular part 691U formed in an annular shape on the second radially inner side and an outer annular part 691S formed in an annular shape on the second radially outer side of the inner annular part 691U. In addition, the contact member 691 includes a connection part 691J that extends in the second radial direction and connects the inner annular part 691U and the outer annular part 691S, and a main valve contact part 691V that contacts the main valve 51. The contact member 691 according to the second embodiment is a component formed in a plate shape as a whole.

As shown in FIG. 15, the inflow part 281 (described later) of the control valve seat 275 is inserted into the inner annular part 691U. Further, the inner annular part 691U is sandwiched and fixed between the spacer member 694 and the main valve 51. The seal member 692 contacts the outer annular part 691S on the second axially outer side.

The main valve contact part 691V is provided at a position in the contact member 691 corresponding to the outer annular part 691S. The main valve contact part 691V protrudes annularly toward the main valve 51. The main valve contact part 691V according to the second embodiment contacts the main valve 51 on the second radially outer side of a facing portion of the inner seat part 551 and on the second radially inner side of the facing portion of the outer seat part 552.

As shown in FIG. 17, the seal member 692 is formed in an annular shape. In addition, an elastically deformable resin material such as engineering plastic or rubber can be used for the seal member 692. Then, as shown in FIG. 15, the seal member 692 seals between the contact member 691 and the cap part 267. More specifically, an outer peripheral surface 692G of the seal member 692 contacts an inner periphery of the cap part 267. A first end surface 692T1 of the seal member 692 on the second axially inner side contacts with the outer annular part 691S of the contact member 691. Accordingly, the seal member 692 prevents the oil in the back pressure chamber 68P from flowing out of the back pressure chamber 68P through a space between the contact member 691 and the cap part 267.

As shown in FIG. 17, the seal member 692 according to the second embodiment includes recesses 69K (an example of a liquid reservoir) on the first end surface 692T1 on the second axially inner side and a second end surface 692T2 on the second axially outer side. The recess 69K has a first recess K1 formed in an annular shape of the seal member 692 and second recesses K2 each linearly formed from the second radially outer side toward the first recess K1.

Here, a high oil pressure in the back pressure chamber 68P is applied to the second end surface 692T2 of the seal member 692. On the other hand, an oil pressure lower than that of the back pressure chamber 68P is applied to the first end surface 692T1 of the seal member 692. Further, by providing the recess 69K in the first end surface 692T1, the seal member 692 according to the second embodiment has a larger area in which the low oil pressure is applied to the first end surface 692T1 than in a case where the recess 69K is not provided. As a result, the pressing force of the seal member 692 against the contact member 691 is increased due to a difference in the oil pressure between the first end surface 692T1 side and the second end surface 692T2 side.

Although the seal member 692 according to the second embodiment has the recess 69K on the second end surface 692T2 that is not in contact with the contact member 691, the recess 69K of the second end surface 692T2 is not an essential configuration in that the pressure difference described above is generated. However, by providing the recesses 69K in both the first end surface 692T1 and the second end surface 692T2, it is possible to attach without taking into account the orientation of the seal member 692 with respect to the contact member 691 when assembling the hydraulic shock absorber 1.

In the second embodiment, by providing the recess 69K in the seal member 692, the oil flows between the seal member 692 and the contact member 691, but the present invention is not limited thereto. For example, the contact member 691 (the example of a back pressure chamber formation part) may have a groove part (an example of the liquid reservoir) into which oil flows into an end surface on the second axially outer side, which is a side facing the seal member 692. Even in this case, the pressing force of the seal member 692 against the contact member 691 is increased due to the difference in the oil pressure between the first end surface 692T1 side and the second end surface 692T2 side.

As shown in FIG. 17, the return spring 693 (an example of the elastic member) includes an annular part 693R (an example of an annular part) formed in an annular shape on the second radially outer side, and a plurality of arm parts 693A extending from the annular part 693R toward the second radially inner side. Further, an elastic member such as a metal can be used as a material of the return spring 693.

An end part of the arm part 693A on the second radially inner side is supported by the spacer member 694. The annular part 693R contacts the seal member 692 on the second axially outer side.

In the second embodiment, the arm part 693A of the return spring 693 presses the seal member 692 against the cap part 267 by a force of a component along the second radial direction. As a result, also in the second embodiment, a sealing performance between the seal member 692 and the cap part 267 is improved.

Control Valve Seat 275

As shown in FIG. 15, a basic configuration of the control valve seat 275 according to the second embodiment is the same as that of the control valve seat 75 according to the first embodiment. However, the control valve seat 275 according to the second embodiment integrally has the functions of the throttle member 79 and the communication part 80 according to the first embodiment.

The control valve seat 275 according to the second embodiment includes the outer seat part 76, the back pressure flow passage 77, and the low speed flow passage 78. In the control valve seat 275 according to the second embodiment, a positional relationship in the second radial direction between the back pressure flow passage 77 and the low speed flow passage 78 is opposite to that of the control valve seat 75 according to the first embodiment. In addition, according to the positional relationship, the control valve 70 according to the second embodiment has an opposite relationship to the control valve 70 according to the first embodiment, also regarding the function of the first facing part 71 and the second facing part 72 in the control valve 70.

The control valve seat 275 according to the second embodiment includes the inflow part 281 through which oil flows from the communication passage L, and a first back pressure communication passage 283 that connects the inflow part 281 and the back pressure chamber 68P. The control valve seat 275 includes the throttle part 279 that is provided in the first back pressure communication passage 283 and throttles the flow of oil, and a second back pressure communication passage 285 that connects the back pressure chamber 68P and the back pressure flow passage 77.

The inflow part 281 communicates with the opening part 55H of the main valve seat 55 on the second axially inner side, and communicates with the low speed flow passage 78 on the second axially outer side.

The first back pressure communication passage 283 communicates with the inflow part 281 on the second radially inner side, and communicates with the back pressure chamber 68P on the second radially outer side.

A flow passage cross sectional area of the oil of the throttle part 279 is smaller than that of the first back pressure communication passage 283 and the back pressure flow passage 77. Further, the throttle part 279 prevents the oil in the back pressure chamber 68P from returning to the inflow part 281.

The second back pressure communication passage 285 communicates with the back pressure chamber 68P on the second axially inner side and communicates with the low speed flow passage 78 on the second axially outer side.

In the hydraulic shock absorber 1 according to the second embodiment configured as described above, by operating the pressing member 65, both adjustment of the damping force at the low speed and adjustment of the damping force at the high speed can be performed.

Third Modification

Next, the hydraulic shock absorber 1 to which a third modification is applied will be described.

Figure 18:
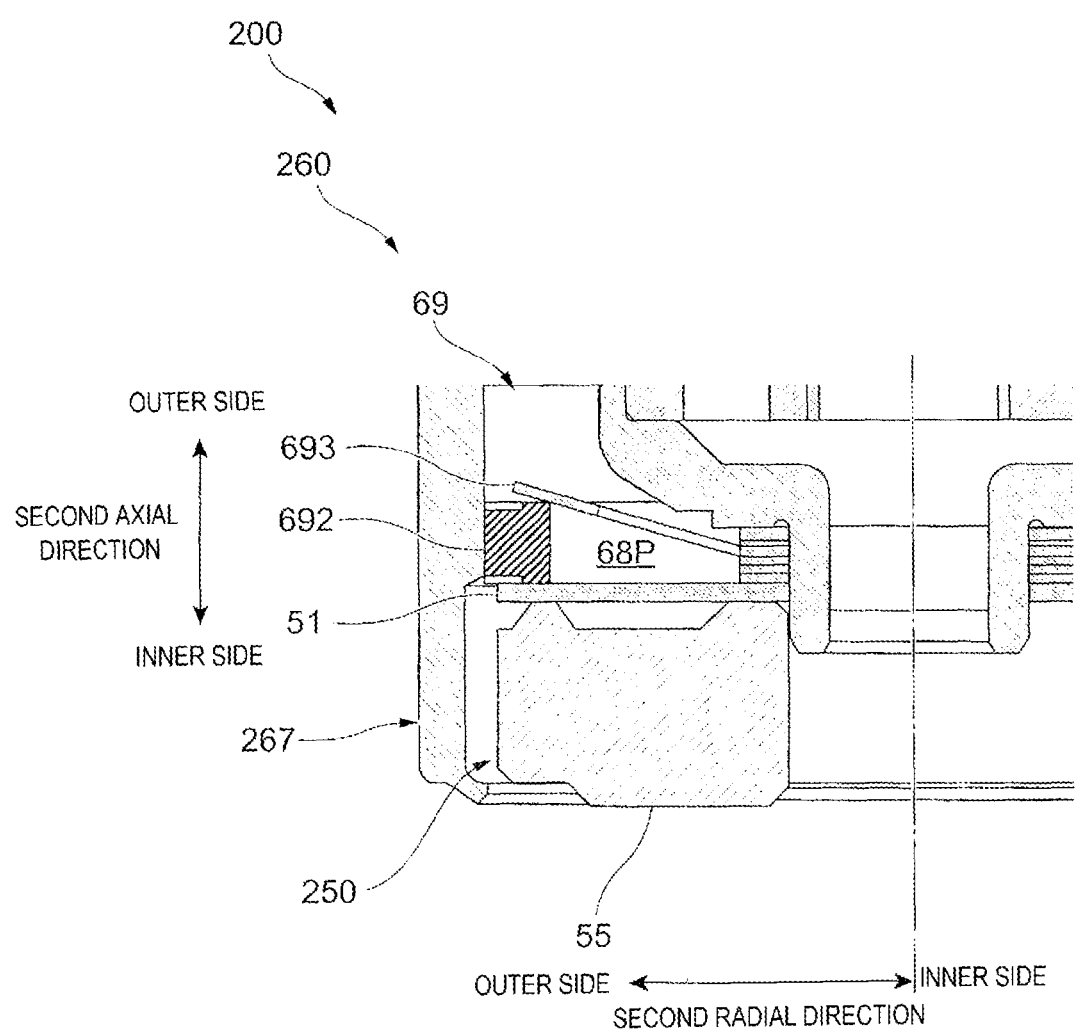
FIG. 18 is an explanatory view of a hydraulic shock absorber according to a third modification.

FIG. 18 is an explanatory view of the hydraulic shock absorber 1 according to the third modification.

The outer damping part 200 according to the third modification is different from the example described above in that the contact member 691 according to the second embodiment is not provided.

As shown in FIG. 18, the seal member 692 according to the third modification is in direct contact with the main valve 51. In the third modification, the seal member 692 also functions as the contact member 691 (the example of the back pressure chamber formation part), and therefore the seal member 692 itself serves as a main component for forming the back pressure chamber 68P.

The return spring 693 is in contact with a corner part of the seal member 692 on the second radially inner side and on the second axially outer side. The return spring 693 applies the force of the component along the second axial direction and the force of the component along the second radial direction to the seal member 692. As a result, the seal member 692 is pressed against the inner periphery of the cap part 267 and is also pressed against the main valve 51.

In the third modification configured as described above, the number of components can be reduced as compared with the back pressure generating mechanism 69 according to the second embodiment, for example.

In the first embodiment, the second embodiment, the first modification, the second modification, and the third modification, the piston part 30 and the bottom part 40 are not limited to the structures shown in the above embodiments, and may have other shapes and other configurations as long as they function as the damping mechanism.

In addition, the respective constituent parts described in the first embodiment, the second embodiment, the first modification, the second modification, and the third modification may be combined or interchanged with each other.

The function of the outer damping part 100 provided outside the cylinder 11 may be provided in the piston part 30 or the like inside the cylinder 11. Similarly, the function of the outer damping part 100 provided outside the cylinder 11 may be provided in the bottom part 40 or the like. The hydraulic shock absorber 1 according to the first embodiment, the second embodiment, the first modification example, the second modification, and the third modification is not limited to a so-called triple pipe structure in which the cylinder 11, the outer tubular body 12, and the damper case 13 are each formed in a tubular shape, but the hydraulic shock absorber 1 may have a so-called double pipe structure formed by the cylinder 11 and the damper case 13.

What is claimed is:

1. A damping force generating mechanism comprising:
    a valve that is configured to control a flow of a liquid in a flow passage through which the liquid flows;
    a flow passage formation part including
        a first seat part that is provided radially outward of a flow passage port of the flow passage, protrudes from the flow passage port and contacts the valve,
        a second seat part that is provided radially outward of the first seat part, protrudes from the flow passage port and contacts the valve, and
        a circulation part having an orifice that allows the liquid to flow from the flow passage port toward the second seat part in a state in which the valve is in contact with the first seat part; and
    a back pressure chamber formation part that forms a back pressure chamber for applying a back pressure to the valve and includes a contact part that contacts with the valve only at a position radially outward of the first seat part and radially inward of the second seat part.

2. The damping force generating mechanism according to claim 1,
    wherein the first seat part and the second seat part are in an annular shapes, and
    wherein the circulation part is provided in the first seat part.

3. The damping force generating mechanism according to claim 1, further comprising:
    another flow passage formation part that forms another flow passage provided in parallel with the flow passage; and
    a second valve that is configured to control a flow of the liquid in the another flow passage.

4. The damping force generating mechanism according to claim 2, further comprising:
    another flow passage formation part that forms another flow passage provided in parallel with the flow passage; and
    a second valve that is configured to control a flow of the liquid in the another flow passage.

5. A damping force generating mechanism comprising:
    a valve that is configured to control a flow of a liquid in a flow passage through which the liquid flows;
    a flow passage formation part including
        a first seat part that is provided radially outward of a flow passage port of the flow passage, protrudes from the flow passage port and contacts the valve,
        a second seat part that is provided radially outward of the first seat part, protrudes from the flow passage port and contacts the valve,
        a common part that is used in common by the first seat part and the second seat part and forms a portion in contact with the valve, and
        a circulation part having an orifice that allows the liquid to flow from the flow passage port toward the second seat part in a state in which the valve is in contact with the first seat part, the circulation part being provided in the common part, wherein
    the first seat part, the second seat part, and the common part are integrally formed in the flow passage formation part.

6. The damping force generating mechanism according to claim 5, further comprising:
    another flow passage formation part that forms another flow passage provided in parallel with the flow passage; and
    a second valve that is configured to control a flow of the liquid in the another flow passage.

7. A pressure shock absorber comprising:
    a cylinder containing a liquid;
    a piston part that is connected to a rod moving in an axial direction and moves in the cylinder;
    a valve that is configured to control a flow of the liquid in a flow passage;
    a flow passage formation part including
        a first seat part that is provided radially outward of a flow passage port of the flow passage, protrudes from the flow passage port and contacts the valve,
        a second seat part that is provided radially outward of the first seat part, protrudes from the flow passage port and contacts the valve, and
        a circulation part having an orifice that allows the liquid to flow from the flow passage port toward the second seat part in a state in which the valve is in contact with the first seat part; and
    a back pressure chamber formation part that forms a back pressure chamber for applying a back pressure to the valve and includes a contact part that contacts with the valve only at a position radially outward of the first seat part and radially inward of the second seat part.

* * * * *